US011513392B1

(12) United States Patent
Luo et al.

(10) Patent No.: US 11,513,392 B1
(45) Date of Patent: Nov. 29, 2022

(54) DIRECT-LIT BACKLIGHT UNITS WITH OPTICAL FILMS

(71) Applicant: Apple Inc., Cupertino, CA (US)

(72) Inventors: Zhenyue Luo, Santa Clara, CA (US); Morteza Amoorezaei, San Jose, CA (US); Qingbing Wang, Campbell, CA (US); Chenhua You, San Jose, CA (US); Meizi Jiao, San Jose, CA (US); Chungjae Lee, San Jose, CA (US); Joshua A. Spechler, Cupertino, CA (US); Xinyu Zhu, San Jose, CA (US); Mingxia Gu, Campbell, CA (US); Jun Qi, San Jose, CA (US); Eric L. Benson, Hillsborough, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/519,358

(22) Filed: Nov. 4, 2021

Related U.S. Application Data

(60) Provisional application No. 63/247,722, filed on Sep. 23, 2021, provisional application No. 63/247,735, (Continued)

(51) Int. Cl.
*G02F 1/13357* (2006.01)
*G02F 1/1335* (2006.01)
*F21V 8/00* (2006.01)

(52) U.S. Cl.
CPC ...... *G02F 1/133611* (2013.01); *G02B 6/0053* (2013.01); *G02B 6/0058* (2013.01); *G02F 1/133514* (2013.01); *G02F 1/133603* (2013.01); *G02F 1/133607* (2021.01); *G02F 1/133609* (2013.01); *G02F 1/133614* (2021.01)

(58) Field of Classification Search
CPC ......... G02F 1/133603; G02F 1/133611; G02F 1/133607; G02F 1/133606; G02F 1/133609; G02F 1/133614; G02B 6/005; G02B 6/0058; G02B 6/0061; G02B 6/0053; G02B 6/0051
See application file for complete search history.

(56) References Cited

U.S. PATENT DOCUMENTS 5,265,792 A    11/1993   Harrah et al.
5,811,925 A    9/1998   Anandan et al.
(Continued)

FOREIGN PATENT DOCUMENTS

CN   109143684 A   *   1/2019   .......... G02B 6/0053
JP   H06102506 A   *   4/1994
WO   2012014600 A1   2/2012

*Primary Examiner* — Erin Kryukova
(74) *Attorney, Agent, or Firm* — Treyz Law Group, P.C.; Joseph F. Guihan

(57) ABSTRACT

A display may have a pixel array such as a liquid crystal pixel array. The pixel array may be illuminated with backlight illumination from a direct-lit backlight unit. The backlight unit may include an array of light-emitting diodes (LEDs) on a printed circuit board. The display may have a notch to accommodate an input-output component. Reflective layers may be included in the notch. The backlight may include a color conversion layer with a property that varies as a function of position. The light-emitting diodes may be covered by a slab of encapsulant with recesses in an upper surface.

13 Claims, 28 Drawing Sheets

Related U.S. Application Data filed on Sep. 23, 2021, provisional application No. 63/247,715, filed on Sep. 23, 2021.

(56) References Cited

U.S. PATENT DOCUMENTS

| | | | |
|---|---|---|---|
| 7,201,497 | B2 | 4/2007 | Weaver, Jr. et al. |
| 7,488,104 | B2 | 2/2009 | Hamada et al. |
| 8,436,388 | B2 | 5/2013 | Lim et al. |
| 8,619,363 | B1 | 12/2013 | Coleman |
| 9,097,826 | B2 | 8/2015 | Vasylyev |
| 9,625,641 | B2 | 4/2017 | Gourlay |
| 10,203,762 | B2 | 2/2019 | Bradski et al. |
| 10,551,880 | B1 | 2/2020 | Ai et al. |
| 10,571,618 | B2 | 2/2020 | Liu et al. |
| 10,613,389 | B2 | 4/2020 | Liu et al. |
| 10,802,336 | B2 | 10/2020 | Liu et al. |
| 10,901,260 | B2 | 1/2021 | Liu et al. |
| 11,009,745 | B2 | 5/2021 | Liu et al. |
| 2005/0001537 | A1 | 1/2005 | West et al. |
| 2005/0127375 | A1 | 6/2005 | Erchak et al. |
| 2005/0140860 | A1 | 6/2005 | Olczak |
| 2006/0082698 | A1 | 4/2006 | Ko et al. |
| 2006/0146571 | A1* | 7/2006 | Whitney .............. G02B 6/0053 362/615 |
| 2007/0200974 | A1 | 8/2007 | Daiku |
| 2009/0009050 | A1 | 1/2009 | Kanade et al. |
| 2009/0059119 | A1 | 3/2009 | Ohta et al. |
| 2009/0135331 | A1 | 5/2009 | Kawase |
| 2010/0265694 | A1 | 10/2010 | Kim et al. |
| 2011/0164203 | A1* | 7/2011 | Kimura .................. G02B 6/003 349/62 |
| 2012/0075549 | A1 | 3/2012 | Lin et al. |
| 2012/0224378 | A1 | 9/2012 | Koike et al. |
| 2015/0219310 | A1 | 8/2015 | Lee et al. |
| 2015/0219936 | A1* | 8/2015 | Kim .................. G02F 1/133602 977/950 |
| 2015/0293391 | A1 | 10/2015 | Yanai et al. |
| 2016/0093677 | A1 | 3/2016 | Tseng |
| 2016/0147063 | A1 | 5/2016 | Border et al. |
| 2016/0154170 | A1 | 6/2016 | Thompson et al. |
| 2016/0363708 | A1 | 12/2016 | You et al. |
| 2017/0199451 | A1 | 7/2017 | Akiyama |
| 2017/0207422 | A1 | 7/2017 | Inoue |
| 2017/0269431 | A1 | 9/2017 | Teragawa |
| 2017/0273203 | A1 | 9/2017 | Iaconis |
| 2017/0299792 | A1 | 10/2017 | Oh et al. |
| 2018/0062049 | A1 | 3/2018 | Otsuka et al. |
| 2018/0080625 | A1 | 3/2018 | Yamada et al. |
| 2018/0081096 | A1 | 3/2018 | Claes |
| 2018/0088404 | A1 | 3/2018 | Chae et al. |
| 2018/0122613 | A1 | 5/2018 | Sadasivan et al. |
| 2018/0182940 | A1 | 6/2018 | Yamamoto et al. |
| 2019/0097097 | A1* | 3/2019 | Ko ........................ H01L 33/505 |
| 2019/0129249 | A1 | 5/2019 | Lee et al. |
| 2019/0187518 | A1 | 6/2019 | Her et al. |
| 2019/0204678 | A1 | 7/2019 | Hosoki |
| 2019/0251897 | A1 | 8/2019 | Toyama et al. |
| 2019/0258115 | A1 | 8/2019 | Kyoukane et al. |
| 2019/0285943 | A1 | 9/2019 | Liu et al. |
| 2019/0285950 | A1* | 9/2019 | Liu .................. G02F 1/133606 |
| 2020/0271994 | A1 | 8/2020 | Zha et al. |
| 2021/0157204 | A1* | 5/2021 | Park .................. G02F 1/133603 |

\* cited by examiner

DIRECT-LIT BACKLIGHT UNITS WITH OPTICAL FILMS

This application claims the benefit of provisional patent application No. 63/247,715, filed Sep. 23, 2021, provisional patent application No. 63/247,722, filed Sep. 23, 2021, and provisional patent application No. 63/247,735, filed Sep. 23, 2021, which are hereby incorporated by reference herein in their entireties.

BACKGROUND

This relates generally to displays, and, more particularly, to backlit displays.

Electronic devices often include displays. For example, computers and cellular telephones are sometimes provided with backlit liquid crystal displays. Edge-lit backlight units have light-emitting diodes that emit light into an edge surface of a light guide plate. The light guide plate then distributes the emitted light laterally across the display to serve as backlight illumination.

Direct-lit backlight units have arrays of light-emitting diodes that emit light vertically through the display. If care is not taken, however, a direct-lit backlight may be bulky or may produce non-uniform backlight illumination.

SUMMARY

A display may have a pixel array such as a liquid crystal pixel array. The pixel array may be illuminated with backlight illumination from a direct-lit backlight unit. The backlight unit may include an array of light-emitting diodes (LEDs) on a printed circuit board.

The backlight unit may include first, second, and third light spreading layers formed over the array of light-emitting diodes. A color conversion layer may be formed over the first, second, and third light spreading layers. First and second brightness enhancement films may be formed over the color conversion layer. A diffusion film may be formed over the brightness enhancement films.

The display may have a notch to accommodate an input-output component. Reflective layers may be included in the notch. An inner surface of a housing sidewall may have a mitigated reflectance portion. A bracket and foam may be included in the notch between the optical films and the liquid crystal display panel. A shielding ring may be included in the liquid crystal display panel to mitigate electrostatic discharge. Foam may be included in an upper housing with the same footprint as a high-rigidity portion of a lower housing.

The color conversion layer may have a property that varies as a function of position. The property may be the thickness of a phosphor layer in the color conversion layer, the concentration of red quantum dots in the color conversion layer, the concentration of green quantum dots in the color conversion layer, or the concentration of scattering dopants in the color conversion layer. Protrusions in the optical films may have rounded tips to mitigate scratching and reduce friction between adjacent optical films.

The light-emitting diodes may be covered by a slab of encapsulant with recesses in an upper surface. Each recess may overlap a respective light-emitting diode. The light-emitting diodes may be arranged in cells. Cells may have different sizes in different portions of the backlight. An adhesive layer having a low dielectric constant and adhesive strips may attach an LED substrate to a housing wall. A conductive adhesive may also attach the LED substrate to the housing wall.

DETAILED DESCRIPTION

Figure 1:
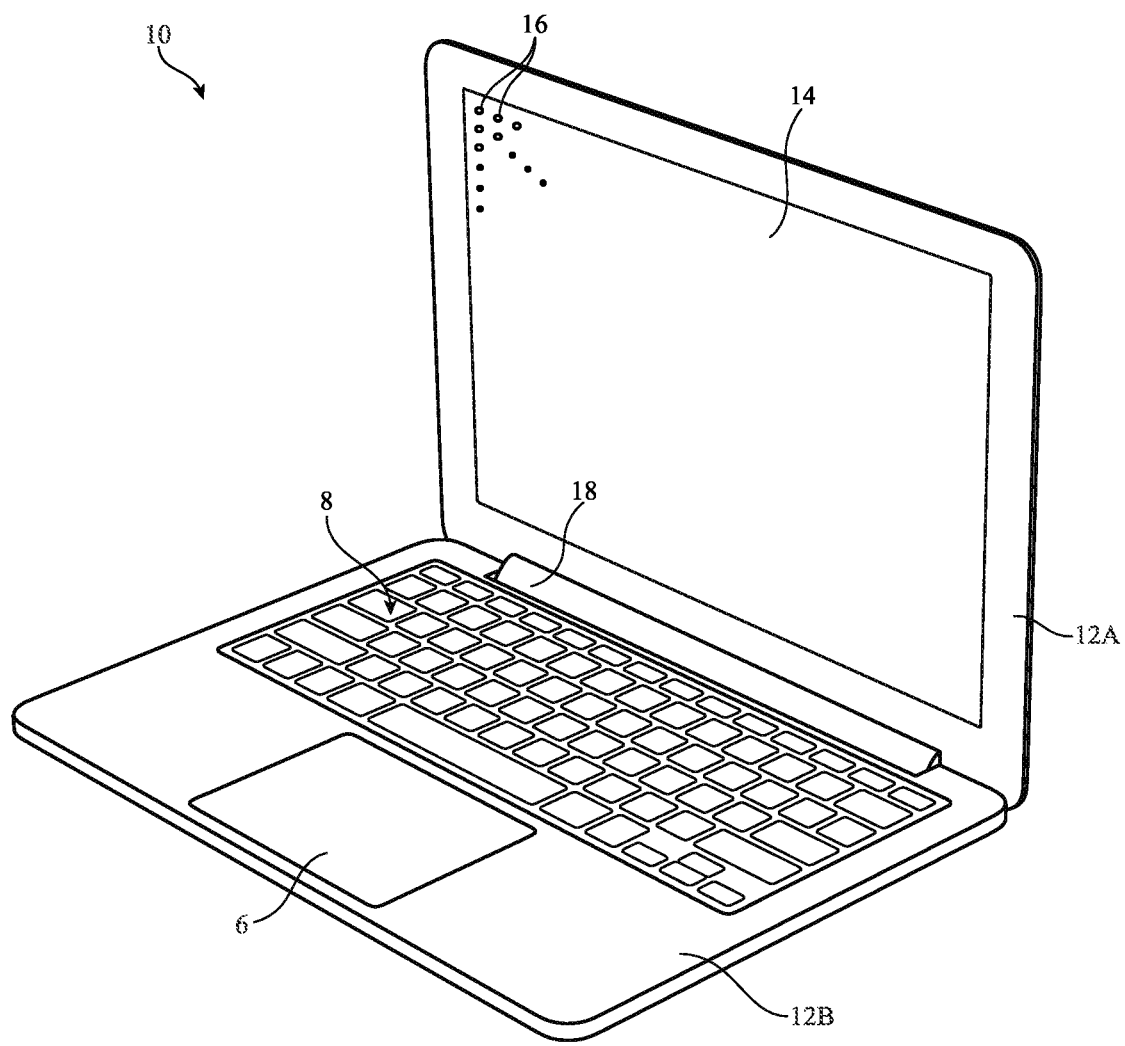
FIG. 1 is a diagram of an illustrative electronic device having a display in accordance with an embodiment.

Electronic devices may be provided with backlit displays. The backlit displays may include liquid crystal pixel arrays or other display structures that are backlit by light from a direct-lit backlight unit. A perspective view of an illustrative electronic device of the type that may be provided with a display having a direct-lit backlight unit is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may have a display such as display 14. Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing 12 may have a stand, may have multiple parts (e.g., housing portions that move relative to each other to form a laptop computer or other device with movable parts), may have the shape of a cellular telephone or tablet computer, and/or may have other suitable configurations. In the arrangement of FIG. 1, housing 12 includes an upper housing 12A that is rotatably coupled to lower housing 12B. Upper housing 12A houses display 14 and may therefore sometimes be referred to as display housing 12A. Lower housing 12B houses keyboard 8 and may therefore sometimes be referred to as keyboard housing 12B. Upper housing 12A may be coupled to lower housing 12B by hinge structures 18. Upper housing 12A may rotate relative to lower housing 12B around a bend axis that is colinear with hinge structures 18.

Each one of lower housing 12B and upper housing 12A may be formed of plastic, glass, ceramics, fiber composites, metal (e.g., stainless steel, aluminum, etc.), other suitable materials, or a combination of any two or more of these materials. Each one of lower housing 12B and upper housing 12A may be formed using a unibody configuration in which some or all of that housing is machined or molded as a single structure or may be formed using multiple structures (e.g., an internal frame structure, one or more structures that form exterior housing surfaces, etc.). The arrangement for housing 12 that is shown in FIG. 1 is illustrative.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Electronic device 10 may include additional input-output components in addition to display 14. As shown in FIG. 1, electronic device 10 may include a keyboard 8 (including a plurality of keys that are pressed by the user to provide input) and a touch-sensitive area 6 (that a user may touch to control the position of a mouse on display 14). Touch-sensitive area 6 may sometimes be referred to as a touchpad or a trackpad. The touch-sensitive area 6 is formed on a surface of lower housing 12B that is exposed when upper housing 12A is opened to expose display 14.

Display 14 may include an array of pixels 16 formed from liquid crystal display (LCD) components or may have an array of pixels based on other display technologies. A cross-sectional side view of display 14 is shown in FIG. 2.

Figure 2:
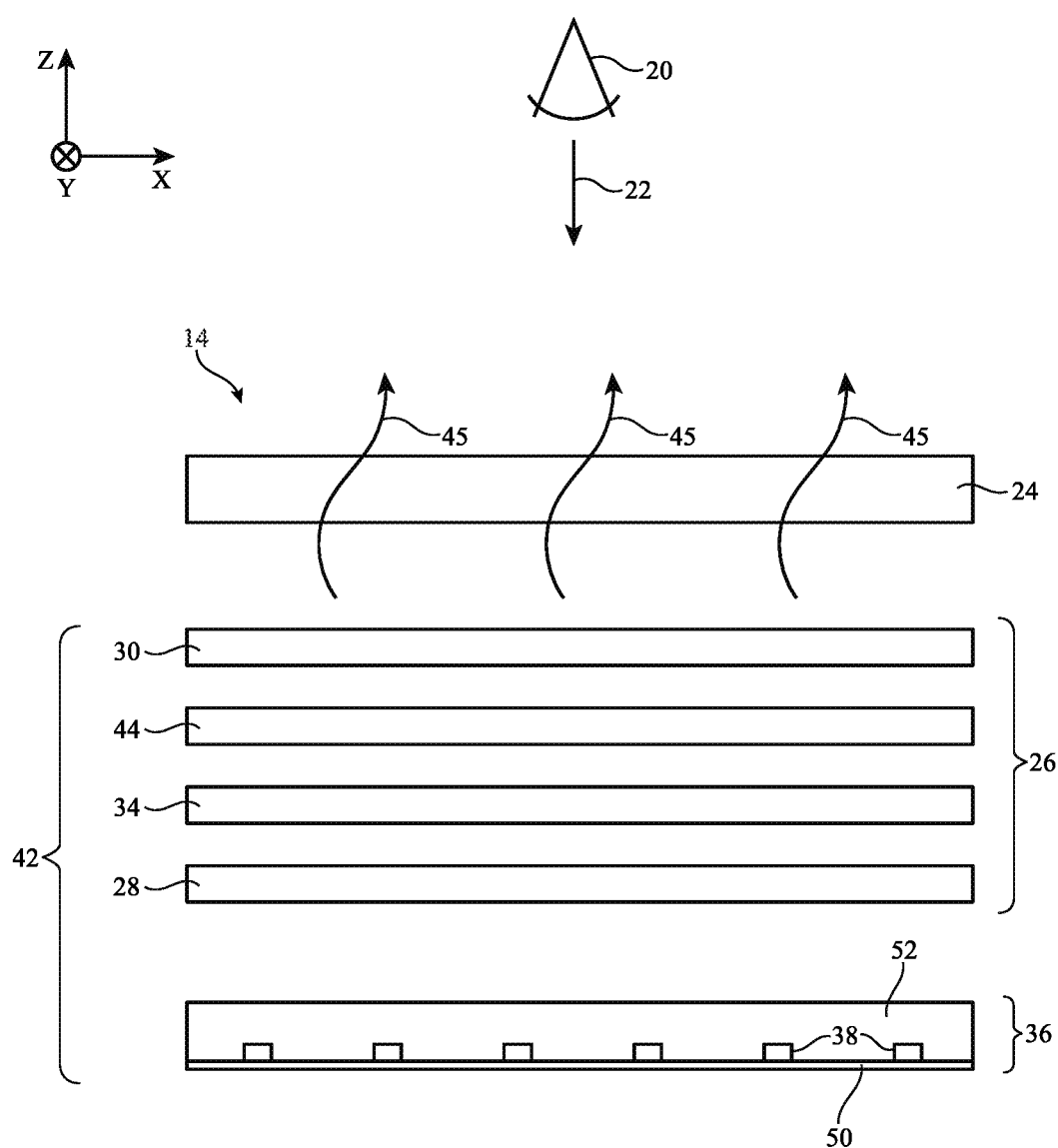
FIG. 2 is a cross-sectional side view of an illustrative display in accordance with an embodiment.

As shown in FIG. 2, display 14 may include a pixel array such as pixel array 24. Pixel array 24 (sometimes referred to as a display panel or liquid crystal display panel) may include an array of pixels such as pixels 16 of FIG. 1 (e.g., an array of pixels having rows and columns of pixels 16). Pixel array 24 may be formed from a liquid crystal display module (sometimes referred to as a liquid crystal display or liquid crystal layers) or other suitable pixel array structures. A liquid crystal display panel for forming pixel array 24 may, as an example, include upper and lower polarizers, a color filter layer and a thin-film transistor layer interposed between the upper and lower polarizers, and a layer of liquid crystal material interposed between the color filter layer and the thin-film transistor layer. Liquid crystal display structures of other types may be used in forming pixel array 24, if desired.

During operation of display 14, images may be displayed on pixel array 24. Backlight unit 42 (which may sometimes be referred to as a backlight, direct-lit backlight, direct-lit backlight unit, backlight layers, backlight structures, a backlight module, a backlight system, etc.) may be used in producing backlight illumination 45 that passes through pixel array 24. This illuminates any images on pixel array 24 for viewing by a viewer such as viewer 20 who is viewing display 14 in direction 22.

Backlight unit 42 may include a plurality of optical films 26 formed over light-emitting diode array 36. Light-emitting diode array 36 may contain a two-dimensional array of light sources such as light-emitting diodes 38 that produce backlight illumination 45. Light-emitting diodes 38 may, as an example, be arranged in rows and columns and may lie in the X-Y plane of FIG. 2. Light-emitting diodes 38 may be mounted on printed circuit board 50 (sometimes referred to as substrate 50) and may be encapsulated by encapsulant 52 (sometimes referred to as transparent encapsulant 52, encapsulant slab 52, etc.). The slab of encapsulant 52 may be formed continuously across the LED array and may have a planar upper surface.

Light-emitting diodes 38 may be controlled in unison by control circuitry in device 10 or may be individually controlled (e.g., to implement a local dimming scheme that helps improve the dynamic range of images displayed on pixel array 24). The light produced by each light-emitting diode 38 may travel upwardly along dimension Z through optical films 26 before passing through pixel array 24.

Optical films 26 may include films such as one or more light spreading layers 28, color conversion layer 34, one or more brightness-enhancement films 44 (sometimes referred to as collimating layers 44), a diffusion film 30, and/or other optical films.

Light-emitting diodes 38 may emit light of any suitable color (e.g., blue, red, green, white, etc.). With one illustrative configuration described herein, light-emitting diodes 38 emit blue light. To help provide uniform backlight across backlight unit 42, light from light-emitting diodes 38 may be spread by light spreading layer 28. The light from the at least one light spreading layer 28 then passes through color conversion layer 34 (which may sometimes be referred to as a photoluminescent layer).

Color conversion layer 34 may convert the light from LEDs 38 from a first color to a different color. For example, when the LEDs emit blue light, color conversion layer 34 may include a phosphor layer (e.g., a layer of white phosphor material or other photoluminescent material) that converts blue light into white light. If desired, other photoluminescent materials may be used to convert blue light to light of different colors (e.g., red light, green light, white light, etc.). For example, one layer 34 may have a phosphor layer that includes quantum dots that convert blue light into red and green light (e.g., to produce white backlight illumination that includes, red, green, and blue components, etc.). Configurations in which light-emitting diodes 38 emit white light (e.g., so that layer 34 may be omitted, if desired) may also be used.

By the time light from light-emitting diodes 38 reaches the one or more brightness-enhancement films 44, the light has been converted from blue to white and has been homogenized (e.g., by the light spreading layer). Brightness-enhancement films 44 may then collimate off-axis light to increase the brightness of the display for a viewer viewing the display in direction 22. Diffusion film 30 may further diffuse the light to homogenize the light ultimately provided to pixel array 24.

Figure 3:
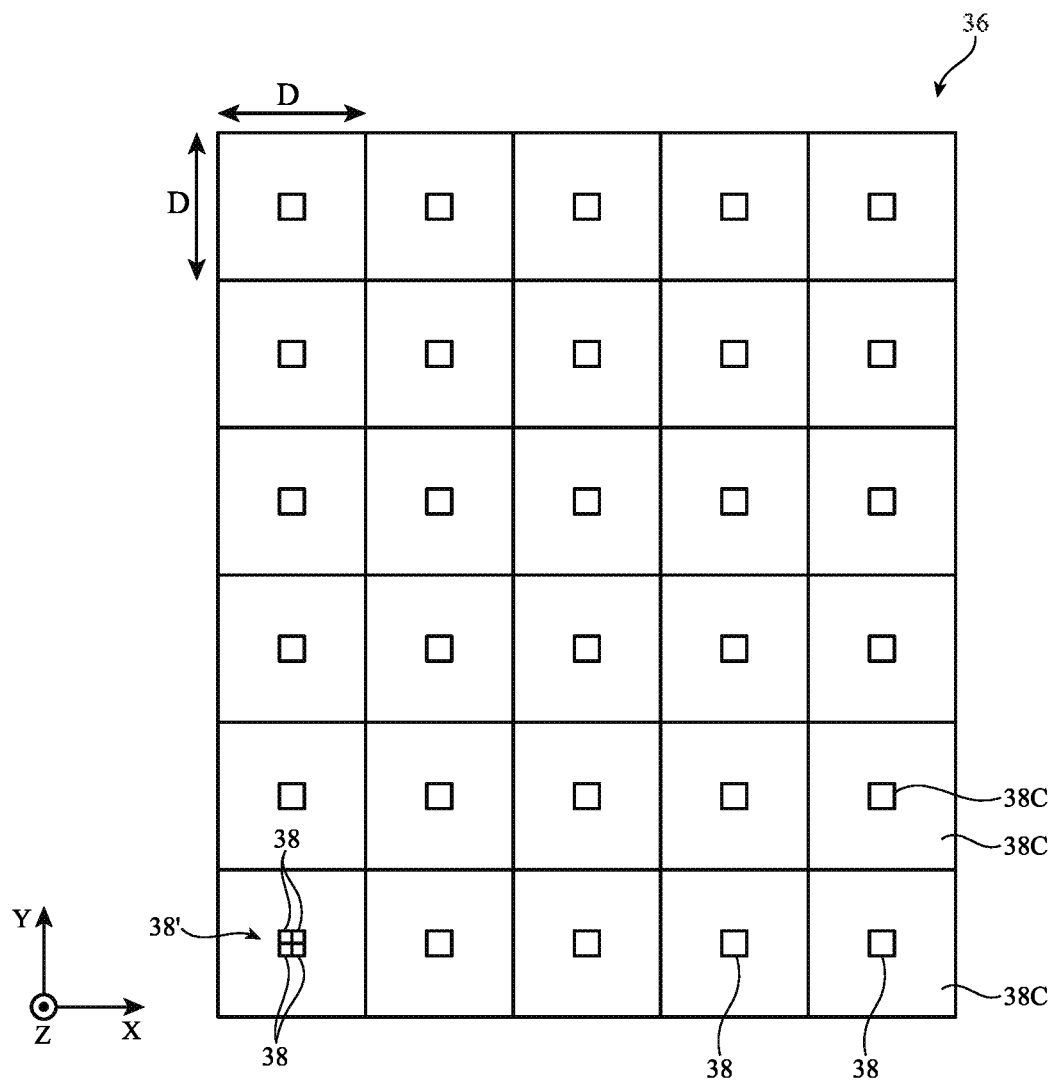
FIG. 3 is a top view of an illustrative light-emitting diode array for a direct-lit backlight unit in accordance with an embodiment.

FIG. 3 is a top view of an illustrative light-emitting diode array for backlight 42. As shown in FIG. 3, light-emitting diode array 36 may contain rows and columns of light-emitting diodes 38. Each light-emitting diode 38 may be associated with a respective cell (tile area) 38C. The length D of the edges of cells 38C may be 2 mm, 18 mm, 1-10 mm, 1-4 mm, 10-30 mm, more than 5 mm, more than 10 mm, more than 15 mm, more than 20 mm, less than 25 mm, less than 20 mm, less than 15 mm, less than 10 mm, less than 1 mm, less than 0.1 mm, greater than 0.01 mm, greater than 0.1 mm, or any other desired size. If desired, hexagonally tiled arrays and arrays with light-emitting diodes 38 that are organized in other suitable array patterns may be used. In arrays with rectangular cells, each cell may have sides of equal length (e.g., each cell may have a square outline in which four equal-length cell edges surround a respective light-emitting diode) or each cell may have sides of different lengths (e.g., a non-square rectangular shape). The configuration of FIG. 3 in which light-emitting diode array 36 has rows and columns of square light-emitting diode regions such as cells 38C is merely illustrative.

If desired, each cell 38C may have a light source that is formed form an array of light-emitting diode dies (e.g., multiple individual light-emitting diodes 38 arranged in an array such as a 2×2 cluster of light-emitting diodes in cell 38C). For example, light source 38' in the leftmost and lowermost cell 38C of FIG. 3 has been formed from a 2×2 array of light-emitting diodes 38 (e.g., four separate light-emitting diode dies). In general, each cell 38C may include a light source 38' with a single light-emitting diode 38, a pair of light-emitting diodes 38, 2-10 light-emitting diodes 38, at least two light-emitting diodes 38, at least 4 light-emitting diodes 38, at least eight light-emitting diodes 38, fewer than five light-emitting diodes 38, or other suitable number of light-emitting diodes. Illustrative configurations in which each cell 38C has a single light-emitting diode 38 may sometimes be described herein as an example. Illustrative configurations in which each cell 38C has four light-emitting diodes 38 may also sometimes be described herein as an example. These examples are, however, merely illustrative. Each cell 38C may have a light source 38 with any suitable number of one or more light-emitting diodes 38. When multiple LEDs are included in a single cell, the multiple LEDs may be controlled in unison (e.g., to have the same brightness). The diodes 38 in light-emitting diode array 36 may be mounted on a printed circuit board substrate (50) that extends across array 36 or may be mounted in array 36 using other suitable arrangements.

Figure 4:
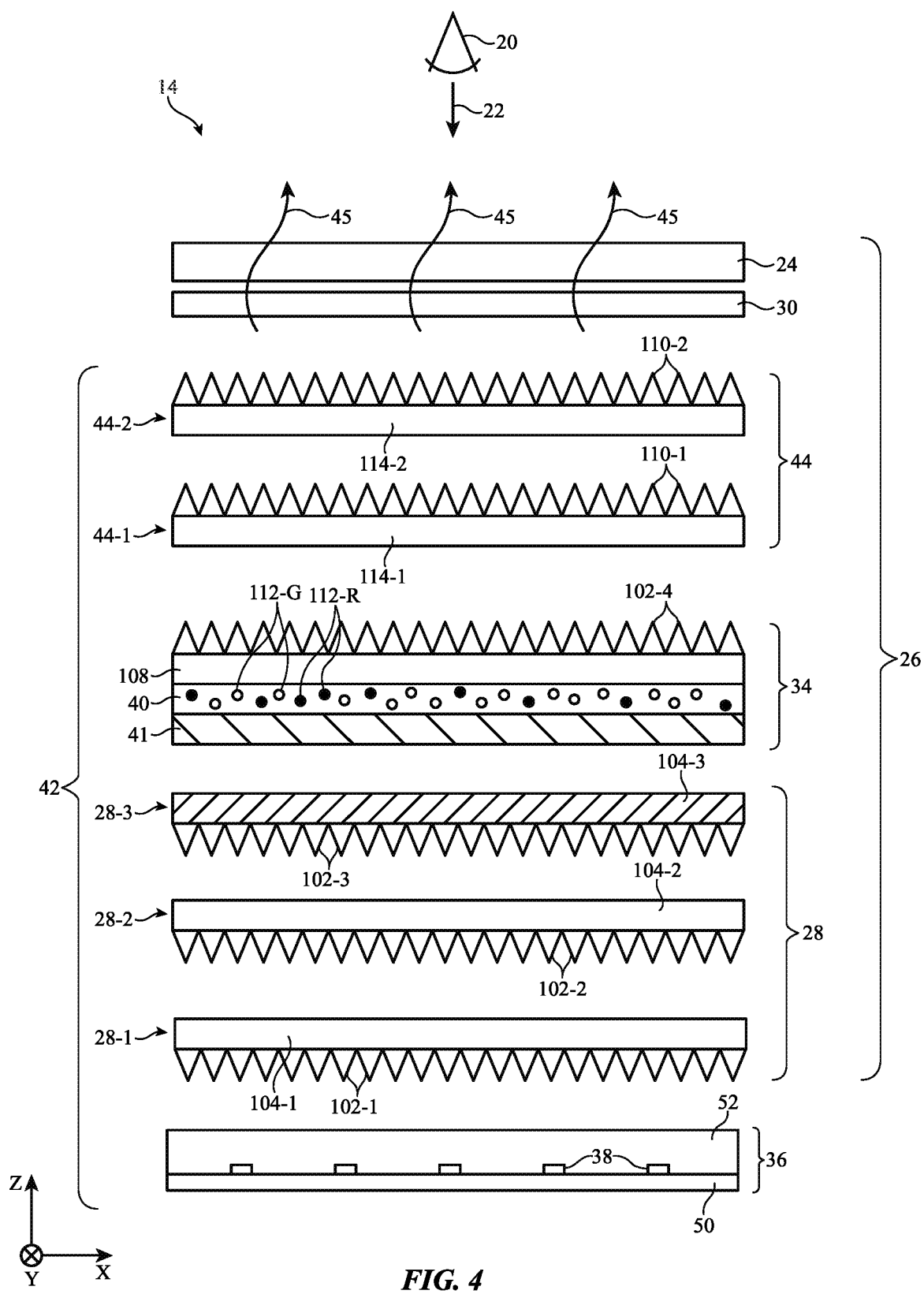
FIG. 4 is a cross-sectional side view of an illustrative display having a direct-lit backlight unit with three light spreading layers, a color conversion layer, two brightness enhancement films, and a diffusion film in accordance with an embodiment.

As previously mentioned, more than one light spreading layer 28 and more than one brightness-enhancement film may be included in the optical films 26 of the backlight unit 42. FIG. 4 is a cross-sectional side view of an illustrative display having three light spreading layers, two brightness-enhancement films, and one diffusion film.

As shown in FIG. 4, a first light spreading layer 28-1, a second light spreading layer 28-2, and a third light spreading layer 28-3 are formed between light-emitting diode array 36 and color conversion layer 34. Each light spreading layer has a similar structure, with protrusions (sometimes referred to as prisms or light-redirecting structures) extending from a substrate (base film). Light spreading layer 28-1 includes protrusions 102-1 that extend from substrate 104-1. Light spreading layer 28-2 includes protrusions 102-2 that extend from substrate 104-2. Light spreading layer 28-3 includes protrusions 102-3 that extend from substrate 104-3.

Substrates 104-1, 104-2, and 104-3 may sometimes be referred to as base film portions and may be formed from a transparent material such as polyethylene terephthalate (PET) or any other desired material. Light-redirecting structures 102-1, 102-2, and 102-3 may be formed from the same material as base film portions 104-1, 104-2, and 104-3 or may be formed from a different material than the base film portion. Different materials may be used in each light spreading layer if desired or the light spreading layers may be formed from the same material(s).

For each light spreading layer, the protrusions 102 may be formed in an array across the light spreading layer. Each protrusion 102 (sometimes referred to as light-redirecting structure 102 or prism 102) may split an incoming point light source into three or more points. The protrusions may have a pyramidal shape (e.g., with a square base and four triangular faces that meet at a vertex), a triangular pyramidal shape (e.g., with a triangular base and three triangular faces that meet at a vertex), partial-cube shape (e.g., corner-cubes by three square faces that meet at a vertex), a tapered pyramid structure (where each face of the pyramid has an upper portion and a lower portion that are at an angle relative to one another), or any other desired shape. Square-based pyramidal protrusions may split a point light source into four points, whereas triangular pyramidal protrusions may split a point light source into three points.

Figure 5:
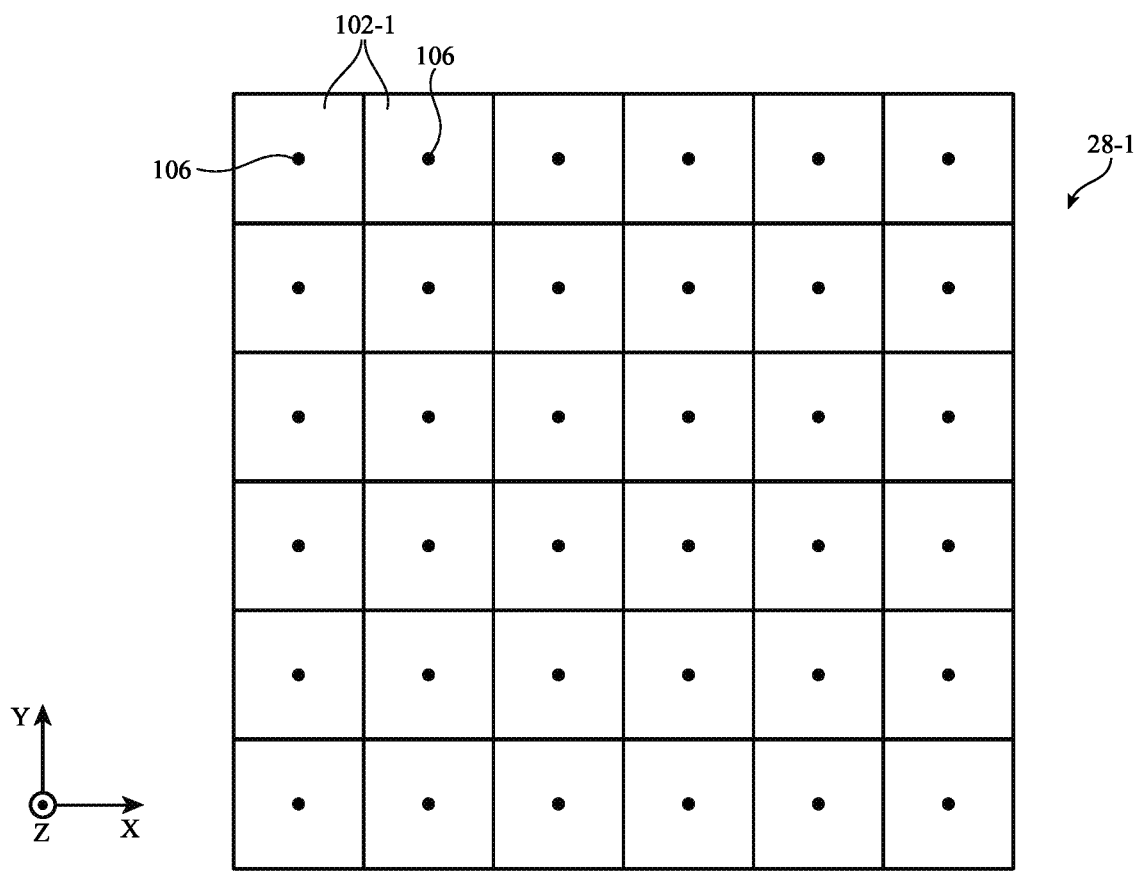
FIG. 5 is a top view of an illustrative light spreading layer showing the layout of pyramidal protrusions in the light spreading layer in accordance with an embodiment.

FIG. 5 is a top view of light spreading layer 28-1 showing how protrusions 102-1 may be arranged in an array. In this case, each protrusion has a pyramidal shape with a square base and four triangular faces that meet at a vertex 106.

The example in FIGS. 4 and 5 of the light-redirecting structures 102 being formed from protrusions from a substrate is merely illustrative. In another possible arrangement, the light-redirecting structures may be formed as recesses in the corresponding substrate film 104. The recesses may have any desired shape (e.g., a square-based pyramidal shape, a triangular-based pyramidal shape, etc.). Additionally, the example in FIG. 4 of light-redirecting structures 102 being formed on the lower surface of the light-redirecting layers is merely illustrative. Light-redirecting structures 102 may alternatively be formed on the upper surface in one or more of the light-redirecting layers.

Substrates 104-1, 104-2, and 104-3 in FIG. 4 may each have a matte upper surface (e.g., the surface that is higher in the positive Z-direction may be matte). The matte upper surface may mitigate undesired reflections in the backlight unit.

Light spreading layer 28-3 (e.g., substrate 104-3 and/or prisms 102-3) may be formed from a diffusive material such that light travelling along the Z-axis is diffused by light spreading layer 28-3. In contrast, light spreading layers 28-1 and 28-2 are not formed from diffusive material. In one arrangement, substrate 104-3 is formed from an entirely different (and more diffusive) material than substrate 104-2 and 104-1. In another possible arrangement, substrates 104-1, 104-2, and 104-3 are formed from the same base material and substrate 104-3 includes an additive that increases the diffusion of substrate 104-3 relative to substrates 104-1 and 104-2 (which do not include the diffusion-increasing additive).

As shown in FIG. 4, color conversion layer 34 may include a phosphor layer 40 (e.g., a layer of white phosphor material or other photoluminescent material) that converts blue light into white light. If desired, other photoluminescent materials may be used to convert blue light from LEDs 38 to light of different colors (e.g., red light, green light, white light, etc.). For example, phosphor layer 40 may include red quantum dots 112-R that convert blue light into red light and green quantum dots 112-G that convert blue light into green light (e.g., to produce white backlight illumination that includes, red, green, and blue components, etc.).

In addition to phosphor layer 40, color conversion layer 34 may include a partially reflective layer 41. Partially reflective layer 41 (sometimes referred to as a dichroic layer or dichroic filter layer) may reflect all red and green light and partially reflect blue light, for example. Partially reflective layer 41 therefore allows for some of the blue light to be recycled through optical films 26.

An additional film such as film 108 may also be included in the color conversion layer. The additional film 108 (sometimes referred to as an optical film, substrate, base film, etc.) may be formed from a polymer material (e.g., polyethylene terephthalate). Light-redirecting structures such as protrusions 102-4 may be formed on an upper surface of additional film 108. Protrusions 102-4 may have any one of the arrangements described above in connection with protrusions 102-1, 102-2, and 102-3 (e.g., an array of pyramids as shown in FIG. 5). Light-redirecting structures 102-4 may be formed from the same material as film 108 or may be formed from a different material than the film 108.

In the example of FIG. 4, a first brightness and enhancement film 44-1 and a second brightness-enhancement film 44-2 are included in the backlight unit. Each brightness-enhancement film has a similar structure, with protrusions (sometimes referred to as prisms or light-redirecting structures) extending from a substrate (base film). Brightness-enhancement film 44-1 includes protrusions 110-1 that extend from substrate 114-1. Brightness-enhancement film 44-2 includes protrusions 110-2 that extend from substrate 114-2.

Substrates 114-1 and 114-2 may sometimes be referred to as base film portions and may be formed from a transparent material such as polyethylene terephthalate (PET) or any other desired material. Light-redirecting structures 110-1 and 110-2 may be formed from the same material as base film portions 114-1 and 114-2 or may be formed from a different material than the base film portions. Different materials may be used in each brightness-enhancement film if desired or the light spreading layers may be formed from the same material(s).

In each brightness-enhancement film, the protrusions 110 may extend in strips across the light spreading layer. For example, protrusions 110-1 may be elongated, parallel protrusions (sometimes referred to as ridges) that extend along a longitudinal axis across the layer (e.g., parallel to the Y-axis in FIG. 4). Protrusions 110-2 may have a similar structure as protrusions 110-1 (with elongated, parallel protrusions extending across the brightness-enhancement film). Protrusions 110-2 may be rotated (e.g., by 90°) relative to the protrusions 110-1.

As yet another possible arrangement, protrusions 110-1 may have any one of the arrangements described above in connection with protrusions 102-1, 102-2, and 102-3 (e.g., an array of pyramids as shown in FIG. 5). Similarly, protrusions 110-2 may have any one of the arrangements described above in connection with protrusions 102-1, 102-2, and 102-3 (e.g., an array of pyramids as shown in FIG. 5).

The example in FIG. 4 of the light-redirecting structures 110 being formed from protrusions from a substrate is merely illustrative. In another possible arrangement, the light-redirecting structures 110 may be formed as recesses in the corresponding substrate film 114. Additionally, the example in FIG. 4 of light-redirecting structures 110 being formed on the upper surface of the brightness-enhancement films is merely illustrative. Light-redirecting structures 110 may alternatively be formed on the lower surface in one or more of the brightness-enhancement films.

In FIG. 4, each adjacent pair of optical films may be separated by an air gap. The air gap may provide a refractive index difference as light enters and exits each optical film, ensuring the light from LEDs 38 is spread by the light spreading layers 28 (e.g., via refraction and/or diffraction). Alternatively, instead of including air gaps between the optical films, a low-index filler material may be formed between each adjacent optical film.

Figure 6:
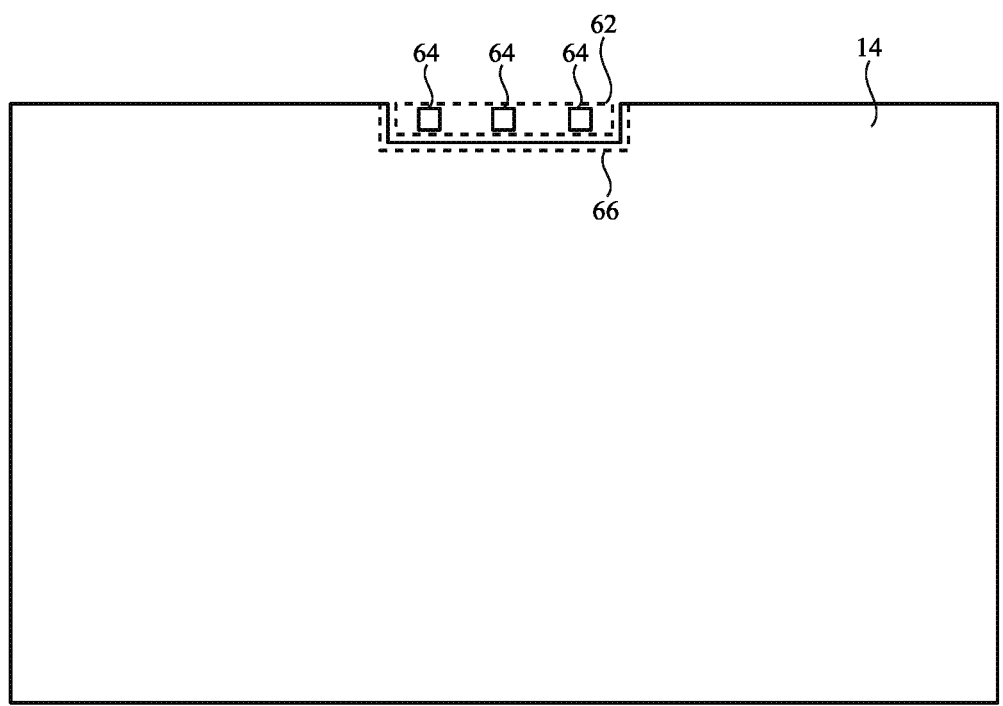
FIG. 6 is a top view of an illustrative display with a notch that accommodates input-output components in accordance with an embodiment.

FIG. 6 is a top view of display 14 showing how the display may have a footprint with a notch along one of its edges. As shown in FIG. 6, display 14 has left and right edges that are connected by upper and lower edges. Along the upper edge of the display, a notch 62 is present. One or more input-output components 64 is included in the region of notch 62. Input-output components 64 may include sensors components such as a camera or an ambient light sensor, light-emitting components, or any other desired input-output components.

LEDs for backlight unit 42 and/or other display components are omitted in notch 62. In other words, every layer of display 14 (e.g., the liquid crystal display panel, the optical films, the LED array, etc.) may optionally have a respective notch in region 62 to accommodate input-output components 64. As a result, no light is emitted by display 14 in notch 62. Additionally, the area of display 14 adjacent to notch 62 (e.g., area 66 in FIG. 6) may be dimmer than the remaining portions of display 14. To better illuminate this area and ensure the display has a uniform brightness adjacent to notch 62 as in other portions of the display, one or more reflective layers may be incorporated in notch 62.

Figure 7A:
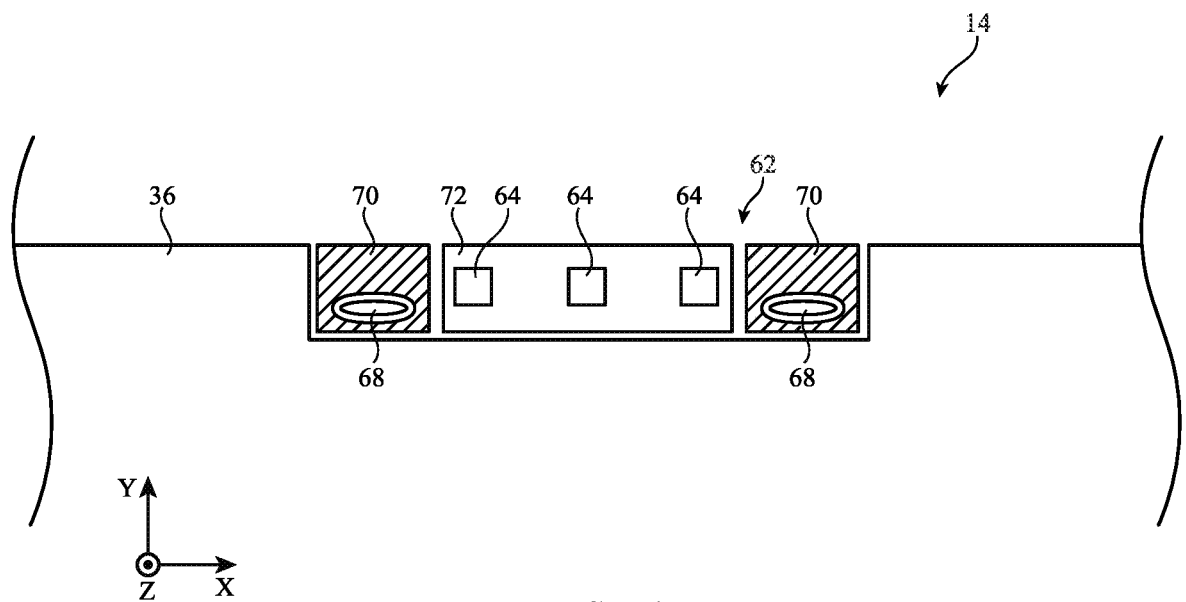
FIG. 7A is a top view of an illustrative display with a notch that includes reflective patches in accordance with an embodiment.

FIG. 7A is a top view of display 14 showing LED array 36. As shown in FIG. 7A, there is a notch in the LED array (e.g., a notch in printed circuit board 50) where no backlight LED components are present. Input-output components 64 may be formed in notch 62. The input-output components may be formed on a substrate 72 (e.g., a printed circuit or other desired substrate). The display may also include protrusions 68 (sometimes referred to as alignment structures 68, attachment structures 68, alignment protrusions 68, attachment structures 68, etc.). Protrusions 68 may protrude into recesses in one or more optical films 26 for the backlight unit 42. In this way, protrusions 68 align the optical films 26 for the backlight unit and ensure the optical films 26 do not undesirably shift during operation of the electronic device.

Protrusions 68 may be formed integrally with upper housing 12A (see FIG. 1) or may be separate structures that are attached to upper housing 12A.

To increase the luminance in regions of the display adjacent to notch 62, reflective layers 70 may be formed in notch 62. In the example of FIG. 7A, first and second reflective layers (sometimes referred to as reflective patches) are incorporated on either side of substrate 72. The first and second reflective layers are therefore formed on first and second opposing sides of notch 62. The reflective layers 70 and substrate 72 may be coplanar. The reflective layers 70 and LED array (e.g., substrate 50, LEDs 38, and/or encapsulant 52) may be coplanar. Each reflective layer 70 may have an opening that receives a corresponding protrusion 68. In other words, each protrusion 68 protrudes through the opening in a respective reflective layer.

Reflective layers 70 may be formed from white ink, metal, or any other desired material. Reflective layers 70 may have a reflectance that is greater than 50%, greater than 60%, greater than 70%, greater than 80%, greater than 90%, etc. Reflective layers 70 may therefore recycle light emitted from the active area of the backlight unit/display back into the active area to increase luminance in region 66 adjacent to the notch, increasing display uniformity around the notch.

Figure 7B:
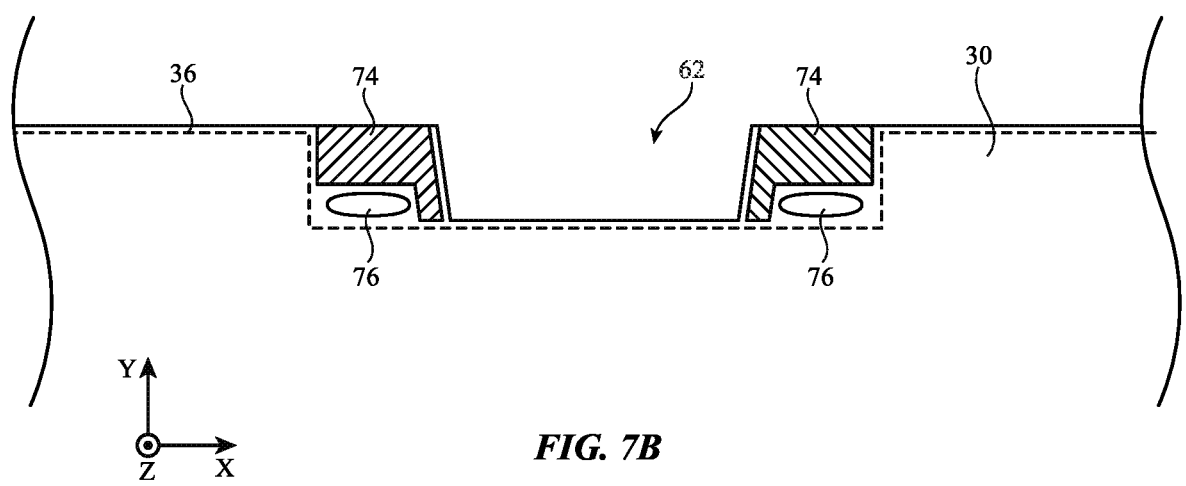
FIG. 7B is a top view of an illustrative diffusion film that includes reflective patches in accordance with an embodiment.

FIG. 7B is a top view of diffuser film 30 for backlight unit 42. In addition to reflective layers 70, display 14 may include reflective layers 74 on diffuser film 30. Diffuser film 30 may have openings 76 that receive protrusions 68. In other words, protrusions 68 protrude through the openings 76 in diffuser film 30, thus maintaining the position of diffuser film 30.

The dashed line shows the position of the LED array 36 relative to diffuser film 30. As shown, diffuser film 30 includes portions that overlap the notch 62 in the LED array. These portions of the diffuser film 30 may overlap reflective layers 70. The width of the notch in diffuser film 30 is therefore less than the width of the notch in LED array 36.

First and second reflective layers 74 (sometimes referred to as reflective patches 74) are formed on diffuser film 30 on either side of the notch in the diffuser film. Each reflective layer 74 may have a footprint that overlaps a footprint of a corresponding, underlying reflective layer 70. Reflective layers 74 may be formed from white ink, metal, or any other desired material. Reflective layers 74 may have a reflectance that is greater than 50%, greater than 60%, greater than 70%, greater than 80%, greater than 90%, etc. Reflective layers 74 may therefore recycle light emitted from the active area of the backlight/display back into the active area to increase luminance in region 66 adjacent to the notch, increasing display uniformity around the notch.

As shown in FIG. 7B, each reflective patch 74 may accommodate a respective opening 76 in the diffusion film 30. In other words, the diffusion film 30 has an upper edge. A notch is formed in the upper edge of diffusion film 30. Diffusion film 30 has side edges and an inset edge that define the notch in the diffusion film 30. A first portion of reflective patch 74 is formed between a respective opening 76 and the upper edge of the diffusion film 30. A second portion of reflective layer 74 is formed between a respective opening 76 and a respective side (notch-defining) edge of the diffusion film 30.

In FIG. 7A, reflective layer 70 may have a width (e.g., the dimension parallel to the X-axis), length (e.g., the dimension parallel to the Y-axis) and height/thickness (e.g., the dimension parallel to the Z-axis). In FIG. 7A, the reflective layer 70 has a width and length that are greater than the thickness of the reflective layer. However, this example is merely illustrative. In another desired arrangement, shown in FIG. 8, reflective layer 70 has a width and/or length that is smaller than the thickness of the reflective layer.

Figure 8:
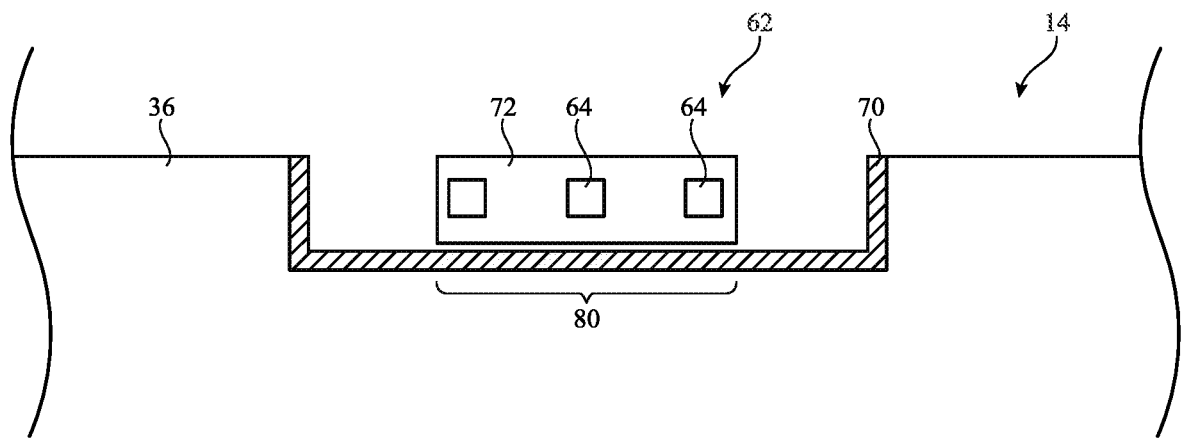
FIG. 8 is a top view of an illustrative display with a notch that has a reflective wall in accordance with an embodiment.

As shown in FIG. 8, reflective layer 70 may be formed in notch 62 at the interface between the notch and the active area of display 14. In other words, reflective layer 70 is formed along the border of LED array 36 within the notch. Reflective layer 70 may be sufficiently thick to be adjacent to the edges of one or more optical films 26 in addition to LED array 36. In other words, the height of reflective layer 70 may be equal to or greater than the height of the optical film stack such that the edge of each optical film is adjacent to a portion of reflective layer 70. This may result in the same boundary condition for display 14 along notch 62 as along the remaining display edges (where the display and optical films are adjacent to a housing wall of upper housing 12A). As a result, the reflection performance is consistent in notch 62 as the other active area edges, resulting in a uniform luminance adjacent to notch 62.

Reflective layer 70 in FIG. 8 (sometimes referred to as reflective wall 70) may be formed integrally with display housing 12A or may be formed from a separate structure that is attached to display housing 12A. Reflective layer 70 in FIG. 8 may have a reflectance that is greater than 40%, greater than 50%, greater than 60%, greater than 70%, greater than 80%, greater than 90%, etc.

The reflective wall in FIG. 8 may extend along the entire notch 62 (e.g., first, second, and third edges of the display that define notch 62) or may be discontinuous within notch 62. For example, the reflective wall may have two or more portions separated by gaps. As an example, first and second portions of the reflective wall may be separated by a gap in region 80 in FIG. 8.

In the arrangement of FIG. 8, reflective wall 70 may serve as a protrusion that aligns optical films 26 within the backlight unit. In other words, optical films 26 may have openings that align with reflective wall 70 such that reflective wall 70 secures the position of optical films 26.

FIG. 7A shows an example where protrusions 68 are used to secure optical films within the display. However, other structures may additionally or instead be used to secure optical films 26 within display 14.

Figure 9A:
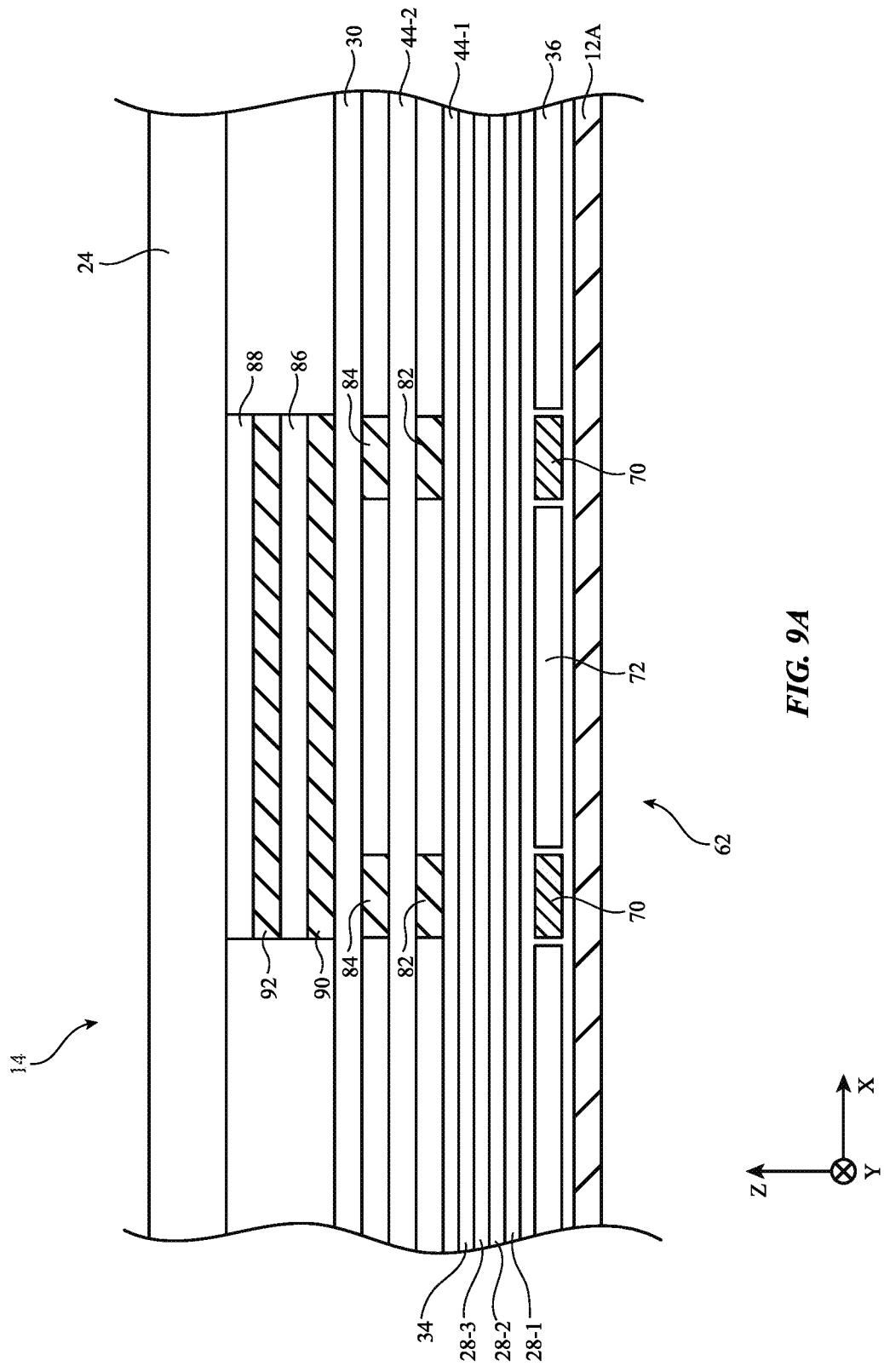
FIG. 9A is a cross-sectional side view of an illustrative display with adhesive patches between optical films, a bracket, and foam in accordance with an embodiment.

FIG. 9A is a cross-sectional side view of display 14 in notch region 62 showing how adhesive patches may be included between optical films in the display to ensure the optical films do not move or rotate during operation of the electronic device. FIG. 9A shows LED array 36 formed over a wall of housing 12A. A portion of LED array 36 is omitted in notch region 62. Substrate 72 (with input-output components 64 as shown in FIG. 7A) and reflective patches 70 are included in the notch in LED array 36.

Optical films 26 including light spreading layer 28-1, light spreading layer 28-2, light spreading layer 28-3, color conversion layer 34, brightness-enhancement film 44-1, brightness-enhancement film 44-2, and diffusion film 30 are formed over LED array 36. The optical films may have one or more portions that overlap some of notch region 62 (e.g., as shown with diffusion film 30 in FIG. 7B).

To prevent rotation, movement, and/or wrinkling of the optical films, first and second adhesive patches 82 are formed between brightness-enhancement film 44-1 and brightness-enhancement film 44-2. Additionally, first and second adhesive patches 84 are formed between brightness-enhancement film 44-2 and diffusion film 30. A first reflective patch 70, a first adhesive patch 82, and a first adhesive patch 84 (e.g., on the left in FIG. 9A) may have footprints that overlap in the Z-direction. A second reflective patch 70, a second adhesive patch 82, and a second adhesive patch 84 (e.g., on the right in FIG. 9A) may also have footprints that overlap in the Z-direction.

As shown in FIG. 9A, display 14 may also include a bracket 86 and foam 88 between the upper-most optical film (diffusion film 30) and the bottom of pixel array 24 (sometimes referred to as display panel 24). A first layer of adhesive 90 is interposed between an upper surface of diffusion film 30 and a lower surface of bracket 86. Bracket 86 may apply compressive force on the optical films 26 (e.g., in the negative Z-direction) to keep the optical films from sliding off alignment protrusions 68. Bracket 86 may have one or more openings to accommodate input-output components 64 that are formed in the notch region. Bracket 86 may be formed from stainless steel or another desired rigid material. A second layer of adhesive 92 is interposed between an upper surface of bracket 86 and a lower surface of foam 88. Foam 88 may be formed from a compressive material and applies compressive force on the optical films 26 (e.g., in the negative Z-direction) to keep the optical films from sliding off alignment protrusions 68. Foam 88 also fills the gap between pixel array 24 and the optical films 26, thus preventing deflection in the Z-direction of the pixel array and improving the structural integrity of the display.

Similar to as shown by openings 76 in diffusion film 30 in FIG. 7B, each optical film 26 may have openings to accommodate protrusions 68 (e.g., in FIG. 7A). The alignment of the optical films is maintained by the protrusions 68.

Figure 9B:
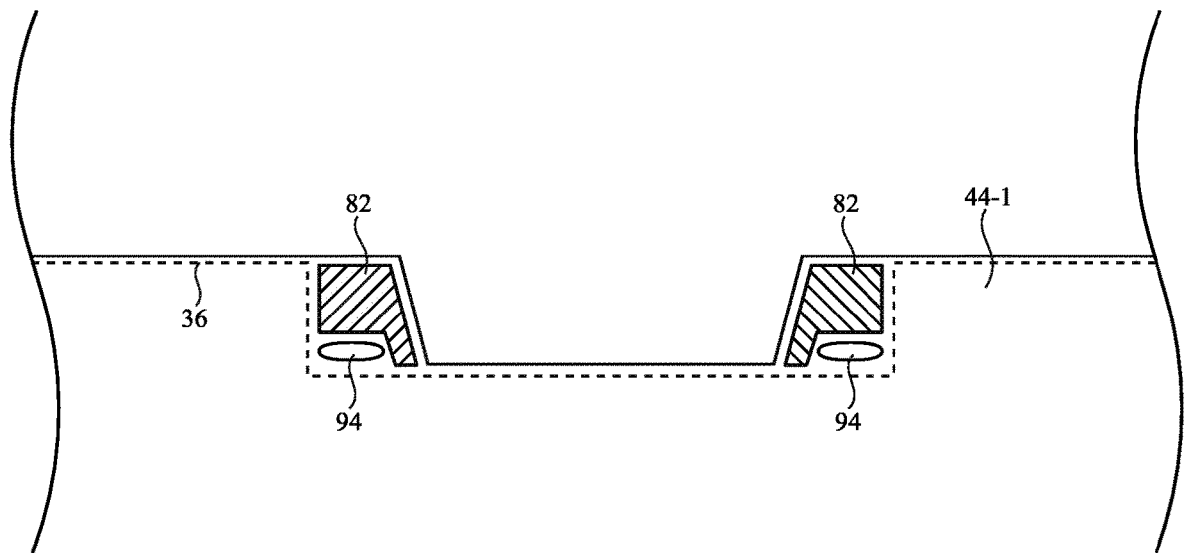
FIG. 9B is a top view of an illustrative optical film with adhesive patches in accordance with an embodiment.

FIG. 9B is a top view of an illustrative optical film with adhesive patches on the top surface. Specifically, FIG. 9B is a top view of brightness-enhancement film 44-1 for backlight unit 42. As shown, brightness-enhancement film 44-1 may have openings 94 that receive protrusions 68. In other words, protrusions 68 protrude through the openings 94 in brightness-enhancement film 44-1, thus maintaining the position of brightness-enhancement film 44-1.

The dashed line shows the position of the LED array 36 relative to brightness-enhancement film 44-1. As shown, brightness-enhancement film 44-1 includes portions that overlap the notch 62 in the LED array. These portions of the brightness-enhancement film 44-1 may overlap reflective layers 70 (see FIGS. 7A and 9A). The width of the notch in brightness-enhancement film 44-1 is less than the width of the notch in LED array 36. The optical films may all have a notch with the same or similar dimensions as the notch shown in FIG. 9B.

First and second adhesive patches 82 (sometimes referred to as adhesive layers 82) are formed on brightness-enhancement film 44-1 on either side of the notch in the brightness-enhancement film 44-1. Each adhesive layer 82 may have a footprint that overlaps a footprint of a corresponding, underlying reflective layer 70.

As shown in FIG. 9B, each adhesive patch 82 may accommodate a respective opening 94 in the brightness-enhancement film 44-1. In other words, the brightness-enhancement film 44-1 has an upper edge. A notch is formed in the upper edge of brightness-enhancement film 44-1. Brightness-enhancement film 44-1 has side edges and an inset edge that define the notch in the brightness-enhancement film 44-1. A first portion of adhesive layer 82 is formed between a respective opening 94 and the upper edge of the brightness-enhancement film 44-1. A second portion of adhesive layer 82 is formed between a respective opening 94 and a respective side (notch-defining) edge of the brightness-enhancement film 44-1.

Brightness-enhancement film 44-2 may have the same or similar footprint as brightness-enhancement film 44-1. Similarly, adhesive patches 84 on brightness-enhancement film 44-2 may have the same or similar arrangement as adhesive patches 82 on brightness-enhancement film 44-1. In other words, each adhesive patch 84 may accommodate a respective opening and may overlap with a respective reflective layer 70 (and respective adhesive patch 82).

Figure 9C:
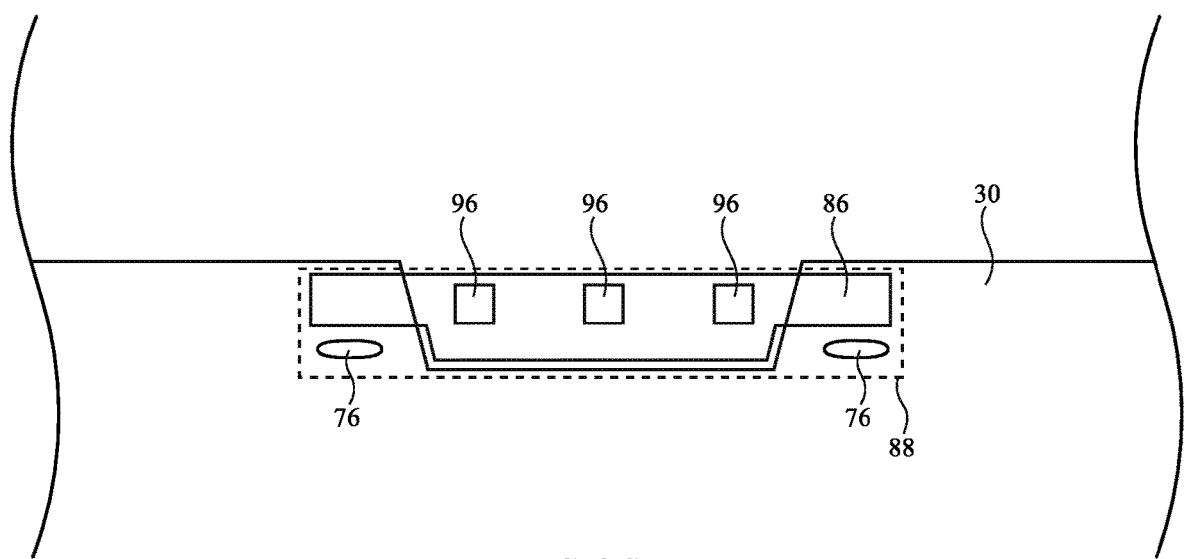
FIG. 9C is a top view of an illustrative diffusion film with an overlying bracket in accordance with an embodiment.

FIG. 9C is a top view of diffusion film 30 showing the position of bracket 86 relative to the notch and openings in the diffusion film. As shown, bracket 86 extends over the notch and has a portion that covers the notch of the optical films and LED array. The portion of bracket 86 in the notch has openings 96 that accommodate input-output components 64 that are positioned in the notch. In other words, input-output components 64 may have a thickness in the Z-direction that protrudes through openings 96 in the bracket 86. First and second opposing sides of the bracket 86 overlap the diffusion film 30 and other optical films 26 in the backlight unit. The bracket does not overlap openings 76 in the diffusion film (and the other corresponding openings in the optical films that are aligned with openings 76).

Foam 88, meanwhile, extends over the notch and has a portion that covers the notch of the optical films and LED array. The portion of foam in the notch has openings with the same footprint as bracket openings 96. The openings in the foam accommodate input-output components 64 that are positioned in the notch. In other words, input-output components 64 may have a thickness in the Z-direction that protrudes through the openings in the foam 88. First and second opposing sides of the foam 88 overlap the diffusion film 30 and other optical films 26 in the backlight unit. Unlike bracket 86, foam 88 overlaps openings 76 in the diffusion film (and the other corresponding openings in the optical films that are aligned with openings 76).

Figure 10:
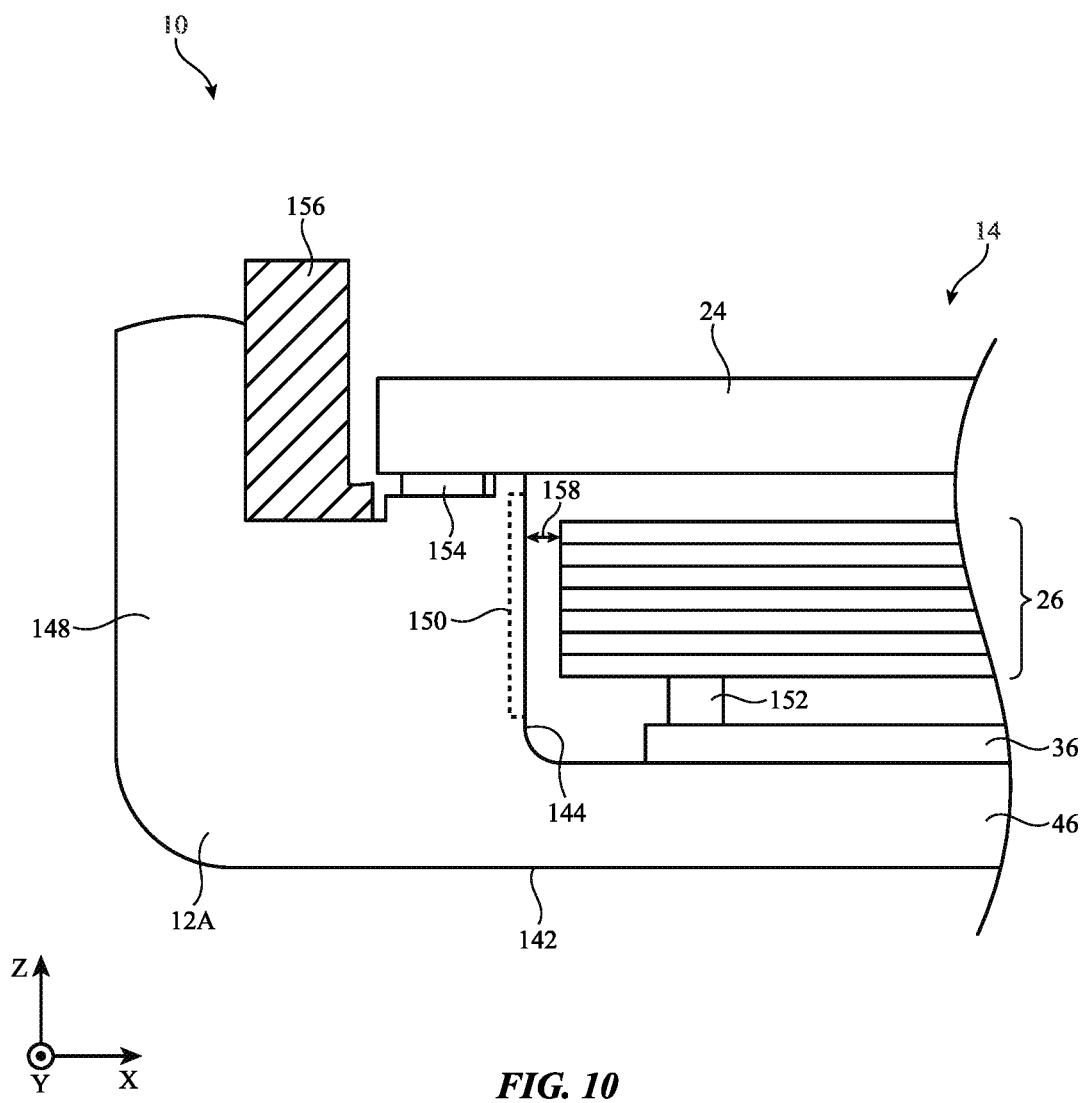
FIG. 10 is a cross-sectional side view of an illustrative device with a housing having an interior wall having a region with mitigated reflectance in accordance with an embodiment.

FIG. 10 is a cross-sectional side view of display 14. FIG. 10 shows how display 14 is formed within display housing 12A. Display 12A has an exterior surface 142 that forms an exterior (outer-most) surface of the electronic device 10 and an interior surface 144. Interior surface 144 may define a cavity that contains the backlight unit 42 and pixel array 24 for display 14.

As shown in FIG. 10, optical films 26 may be formed over LED array 36 within display housing 12A. Optical films 26 and LED array 36 may be parallel to a rear wall 146 of the display housing. The rear wall 146 (sometimes referred to as rear wall portion 146) extends parallel to the XY-plane. In addition to rear wall 146, display housing 12A has a sidewall portion 148 (sometimes referred to as sidewall 148) that extends in the Z-direction. Sidewall portion 148 has a portion 150 of interior surface 144 that faces the optical films 26.

FIG. 10 additionally shows how a spacer 152 may be formed between LED array 36 and optical films 26. Spacer 152 may optionally be an adhesive spacer. Similarly, a spacer 154 may be formed between housing 12A and pixel array 24. Spacer 154 may optionally be an adhesive spacer. The electronic device also includes a trim structure 156. Trim structure 156 may have a rounded upper surface.

To minimize the width of the border region of the display, the edges of optical films 26 may be positioned very close to portion 150 of interior surface 144 of display housing 12A. The magnitude of gap 158 between the edge of films 26 and interior surface 144 may be less than 30 millimeters, less than 15 millimeters, less than 10 millimeters, less than 5 millimeters, less than 3 millimeters, less than 2 millimeters, less than 1 millimeter, less than 0.5 millimeters, less than 0.3 millimeters, less than 0.1 millimeters, less than 0.05 millimeters, etc.

If care is not taken, light may exit the edges of optical films 26 and reflect off of the interior surface 144 of display housing 12A towards a viewer. This may cause the edge of the display to have a blue tint, particularly at off-axis viewing angles. To mitigate this issue, portion 150 of interior surface 144 of housing 12A may be treated or coated to mitigate the reflectance of portion 150.

As one example, portion 150 of housing 12A may be laser treated to mitigate the reflectance of the housing 12A. Housing 12A may be formed from a metal material such as aluminum. Laser darkening may be performed on the aluminum housing to reduce reflectance. The example of using laser darkening to mitigate the reflectance in portion 150 of housing 12A is merely illustrative. A double anodization technique may instead be used if desired. As yet another example, a black or gray ink or a less reflective metal than the rest of housing 12A may be coated/plated on the housing in region 150.

Ultimately, portion 150 of interior surface 144 of housing 12A may have a lower reflectance (at visible light wavelengths) than the adjacent portions of interior surface 144. Portion 150 of interior surface 144 of housing 12A may also have a lower reflectance than exterior surface 142 of housing 12A. The reflectance in portion 150 may be selected to be sufficiently low to mitigate the blue tint in the display at off-axis viewing without causing a dark edge in the display. The reflectance in portion 150 may be greater than 20%, greater than 30%, greater than 35%, greater than 40%, greater than 50%, less than 80%, less than 60%, less than 50% less than 45%, less than 40%, between 35% and 45%, between 30% and 50%, etc. The difference in reflectance between portion 150 of housing 12A and the adjacent/remaining portions of housing 12A may be greater than 10%, greater than 20%, greater than 30%, greater than 40%, greater than 50%, between 30% and 50%, etc. As one specific example, portion 150 may have a reflectance between 35% and 45% while the rest of housing 12A has a reflectance between 70% and 80%. In some cases, the bulk of housing 12A may have a reflectance that is within the target range for portion 150. Therefore, portion 150 may match the rest of the housing (because no modification is required to optimize the reflectance in portion 150). For example, the entire housing 12A may have a reflectance between 35% and 45%.

Figure 11:
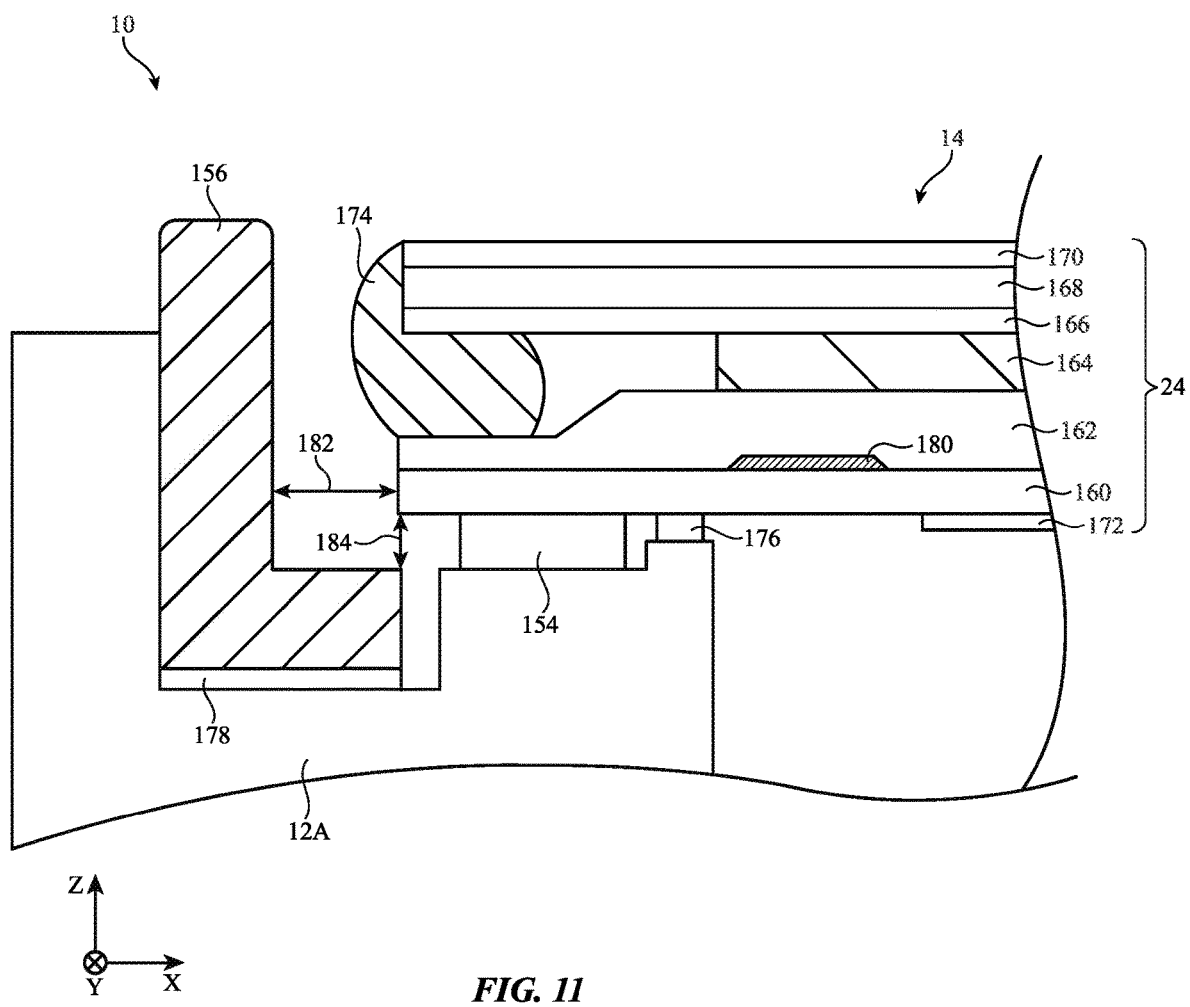
FIG. 11 is a cross-sectional side view of an illustrative device having a shielding ring to mitigate electrostatic discharge in accordance with an embodiment.

FIG. 11 is a cross-sectional side view of display 14 showing additional details regarding trim structure 156 and pixel array 24. As shown in FIG. 11, pixel array 24 includes a polarizer 172, first substrate 160 (e.g., a thin-film transistor substrate), one or more layers 162 that are formed over substrate 160, a sealant 164 that is formed over layers 162, one or more layers 166 that are formed over sealant 164, a second substrate 168 (e.g., a color filter substrate) that is formed over layers 166, and a polarizer 170 that is formed over substrate 168.

Polarizers 170 and 172 may be linear polarizers that control the light emitted by the liquid crystal display. Polarizer 172 (sometimes referred to as a lower polarizer or rear polarizer) may ensure light enters the display panel with a uniform polarization. A liquid crystal layer may be formed between substrates 168 and 160 (e.g., coplanar with sealant 164). Thin-film transistor circuitry within substrate 160 may control the liquid crystal layer in the display to selectively rotate or not rotate the polarization of the light. Light that exits the liquid crystal layer with a polarization aligned with the pass-axis of polarizer 170 will exit the display and be viewable to a user. Light that exits the liquid crystal layer with a polarization not aligned with the pass-axis of polarizer 170 will be blocked and not be viewable to a user. Layers 162 may include multiple dielectric layers (e.g., passivation layers, liquid crystal alignment layers, etc.). Layers 166 may include multiple dielectric layers (e.g., adhesive layers, liquid crystal alignment layers, black masking layers, etc.). An additional encapsulant material 174 (sometimes referred to as potting 174) may be formed along the edge of display panel 24. Color filter substrate 168 may include an array of color filter elements that impart desired colors to the light emitted by pixels within the display panel.

A first spacer 154 may be formed between housing 12A and display panel 24. Spacer 154 may optionally be an adhesive spacer. A second spacer 176 may be formed between housing 12A and display panel 24. Spacer 176 may optionally be an adhesive spacer. Spacers 154 and 176 may directly contact substrate 160. Trim structure 156 may be attached to housing 12A with an adhesive layer 178. Trim structure 156 may have a rounded upper surface.

To minimize the width of the non-light-emitting border of display 14, pixel array 24 may include traces that are close to the display edges, making the display susceptible to electrostatic discharge (ESD) damage. To prevent electrostatic discharge damage, a shield ring 180 may be formed around the periphery of the display. Shield ring 180 may have a ring shape with a footprint that matches the footprint of the edges of the display (e.g., the shield ring extends around the entire periphery of the display and accommodates the notch). Shield ring 180 therefore has a central opening in which the active area of the display is formed. Shield ring 180 may be electrically connected to ground and therefore may sometimes be referred to as grounding ring 180.

Additionally, to prevent electrostatic discharge damage, sealant 164 may overlap the metal traces on the edge of substrate 160. Thin-film transistor substrate 160 may include a number of metal traces that form thin-film transistor circuitry for the display. Sealant 164 may extend to the edge of the display panel to overlap ground ring 180 and other traces at the edges of the display panel. As previously mentioned, sealant 164 may be a liquid crystal sealant that contains the liquid crystal layer within the display.

Trim structure 156 may be positioned such that air gaps are present between the trim structure 156 and adjacent display panel structures to prevent electrostatic discharge damage. As shown in FIG. 11, trim structure 156 is separated from substrate 160 by gap 182 in the X-direction and gap 184 in the Z-direction. Gaps 182 and 184 may be greater than 5 micron, greater than 10 micron, greater than 20 micron, greater than 50 micron, greater than 100 micron, between 10 micron and 50 micron, etc. Trim structure 156 may be formed from a plastic material in some embodiments. Alternatively, trim structure 156 may be formed from a conductive material and electrically connected to housing 12A using a conductive adhesive 178. This type of arrangement may provide an electrostatic discharge path from trim structure 156 to housing 12A (through adhesive 178).

Figure 12A:
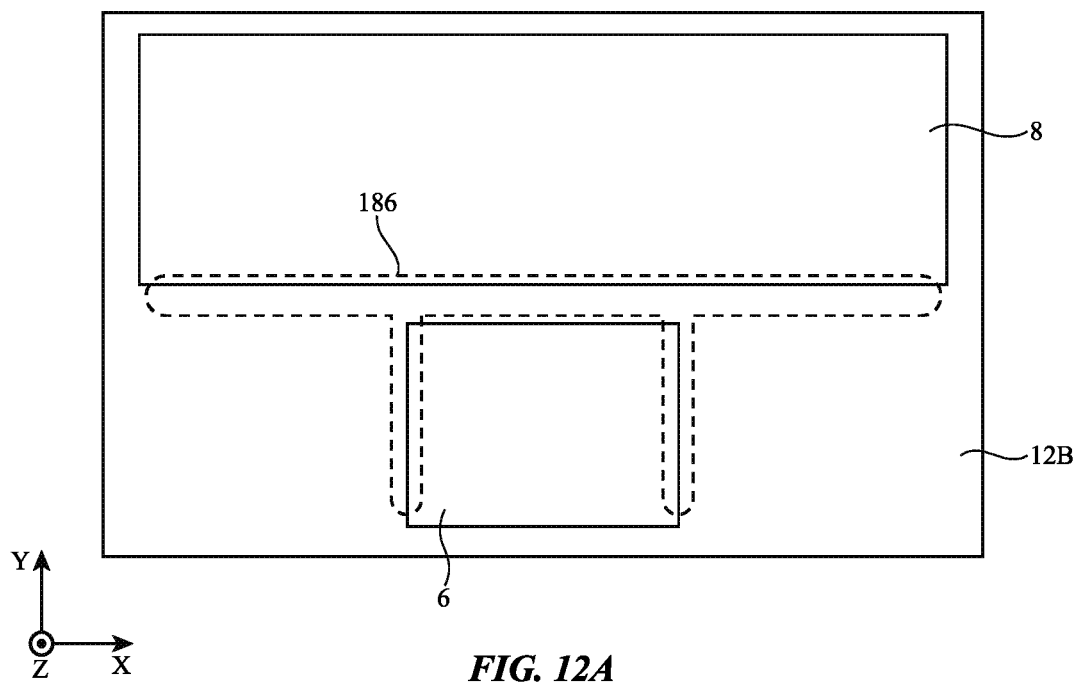
FIG. 12A is a top view of an illustrative lower housing having a rigid portion in accordance with an embodiment.

FIG. 12A is a top view of lower housing 12B of electronic device 10. As previously discussed, lower housing 12B includes a keyboard 8 and a touch-sensitive area (touch pad) 6. To maintain the structural integrity of lower housing 12B and the input-output devices (e.g., keyboard 8 and touchpad 6) in the lower housing 12B, wall structures may be included in the interior of housing 12B. The wall structures may be aligned with the lower edge of keyboard 8 and the left and right edges of touch pad 6. The wall structures may have a footprint that results in the lower housing 12B having a high rigidity in region 186 of the housing. The rigidity of housing 12B (and associated internal components) is higher in region 186 than in surrounding portions of housing 12B. Region 186 has a first portion that extends along (and overlapping) a lower edge of keyboard 8, a second portion that extends from the first portion and orthogonal to the first portion along (and overlapping) a left edge of touchpad 6, and a third portion that extends from the first portion and orthogonal to the first portion along (and overlapping) a right edge of touchpad 6.

Figure 12B:
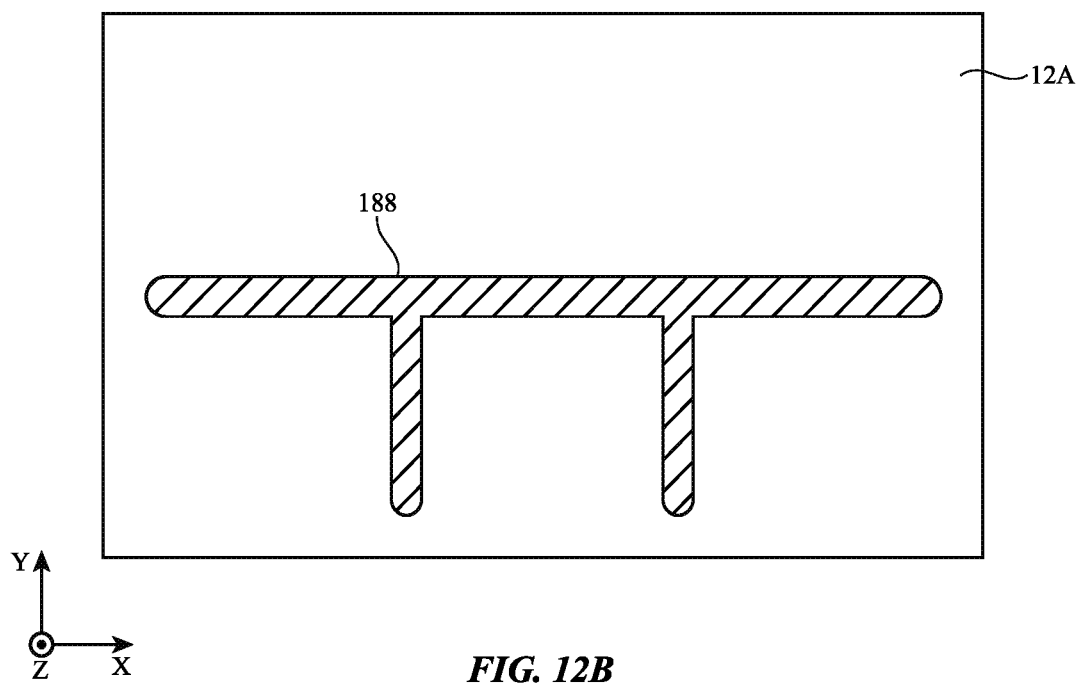
FIG. 12B is a top view of an illustrative upper housing having a foam structure that overlaps the rigid portion of the lower housing in accordance with an embodiment.

The high-rigidity portion 186 may have the potential to cause damage display 14 in upper housing 12A in an impact event. To prevent damage of this type, housing 12A may include a foam structure. FIG. 12B is a top view of an upper housing 12A with a foam structure. As shown, foam structure 188 is formed in upper housing 12A. The foam structure 188 may be, for example, embedded in a pocket in the rear wall 146 of housing 12A. The rear wall of housing 12A may cover foam structure 188 on both sides in one possible arrangement. Alternatively, rear wall portion 146 of housing 12A may cover foam structure 188 on the exterior side of the device but not the interior side of the device. In other words, foam structure 188 may be exposed at the interior of the device if desired.

As shown in FIG. 12B, foam 188 has a footprint that overlaps the footprint of high-rigidity region 186 in lower housing 12B (shown in FIG. 12A). When the laptop computer of FIG. 1 is closed, foam 188 aligns with and overlaps high-rigidity region 186. Having the foam in this area may prevent damage to display 14 during operation of the electronic device. For example, during an impact event on upper housing 12A when the laptop computer is closed, damage to the display is mitigated by foam 188.

To further improve the mechanical strength of the electronic device, the pocket in display housing 12A that contains foam 188 may be formed with rounded corners to prevent high stress concentration areas from forming.

Figure 13:
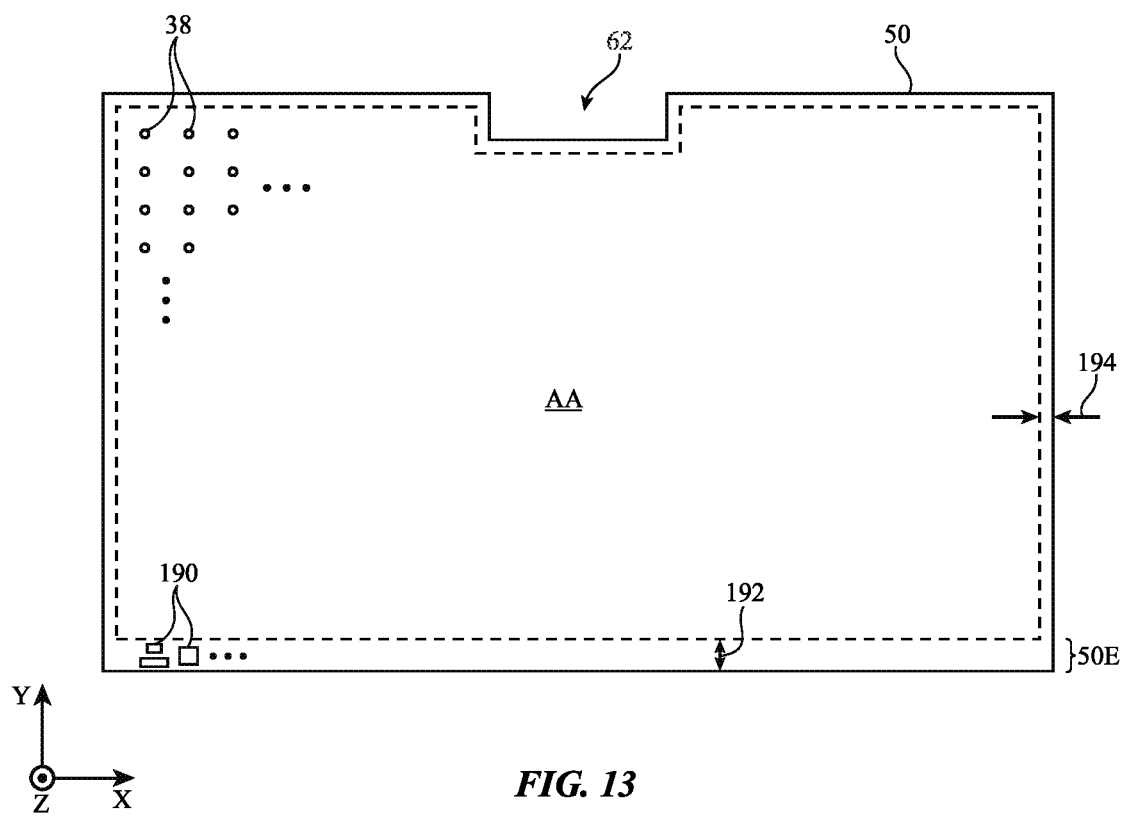
FIG. 13 is a top view of an illustrative display having electronic components along a lower edge of a LED substrate in accordance with an embodiment.

FIG. 13 is a top view of an illustrative LED array with LEDs 38 formed across printed circuit board 50. As shown, LEDs 38 may be distributed across an active area (AA) of the display. The active area is the footprint of the display that actually emits light, and may optionally be defined by an opaque masking layer in the display stack-up. Herein, the display panel, printed circuit board, backlight unit, optical films, and other desired display layers may all be referred to as having an active area. The active area of each layer may simply refer to the footprint of each layer that overlaps with the light-emitting area of the display. In the example of FIG. 13, the active area has right-angled corners and a notch 62. This example is merely illustrative. In general, the active area may have any desired shape. Printed circuit board 50 may have an inactive area (e.g., an area that does not vertically overlap the light-emitting footprint of the display) in addition to the active area.

In addition to LEDs being mounted on printed circuit board 50, additional electronic components 190 (sometimes referred to as surface mount components) may be mounted to printed circuit board 50. The printed circuit board may have an edge 50E in the inactive area that includes components 190. Components 190 may include, for example, driving circuitry (e.g., one or more display driver integrated circuits) that is used to control LEDs 38 in the LED array. Components 190 may be attached to the upper surface of the printed circuit board using solder. As shown in FIG. 13, the components 190 are consolidated in one edge 50E of the printed circuit board. This allows only one edge of the printed circuit board to have a larger gap between the edge of the printed circuit board and the active area (e.g., distance 192 in FIG. 13). The remaining three edges of the printed circuit board have a smaller gap between the edge of the printed circuit board and the active area (e.g., distance 194 in FIG. 13). In other words, distance 194 is less than distance 192.

During a drop or impact event, one or more optical films 26 in the backlight unit may shift into the edge of the printed circuit board with the electronic components 190. If care is not taken, one of the optical films may strike an electronic component 190 and dislodge the electronic component from the printed circuit board. To ensure the reliability of electronic components 190, a mechanical structure may be included along the edge of the printed circuit board to prevent the electronic components from being dislodged or damaged during a drop event.

Figure 14:
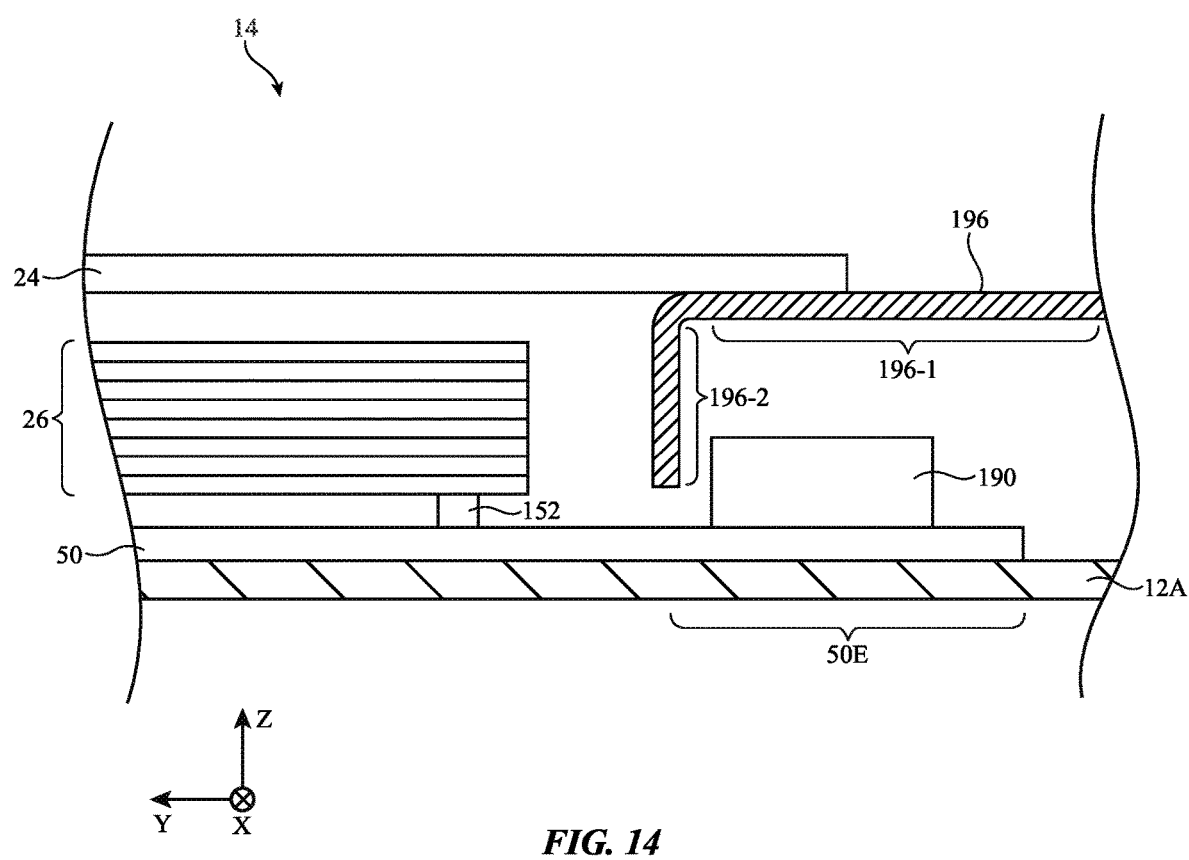
FIG. 14 is a cross-sectional side view of an illustrative display having a chassis with a bent portion that protects electronic components along the edge of a substrate in accordance with an embodiment.

FIG. 14 is a cross-sectional side view of display 14. As shown in FIG. 14, substrate 50 (for LED array 36) extends across the display parallel to the rear wall of housing 12A. An array of LEDs is mounted on substrate 50. Additionally, along the edge 50E of substrate 50, additional electronic components 190 are mounted.

Display panel 24 may be mounted to a stiffening component 196. Stiffening component 196 may sometimes be referred to as a chassis, stiffener, bracket, etc. Chassis 196 may have a first portion (e.g., portion 196-1) parallel to substrate 50, the rear housing wall, and the XY-plane that serves as a mounting substrate for display panel 24. In other words, an edge of the display panel 24 is mounted on portion 196-1 of component 196 (as shown in FIG. 14). Component 196 may be formed from metal (e.g., stainless steel) and may have a high rigidity.

To protect electronic components 190 along the edge 50E, chassis 196 includes an additional portion 196-2 that is orthogonal to substrate 50, the rear housing wall, portion 196-1, and the XY-plane. Portion 196-2 is parallel to the XZ-plane. Portion 196-2 extends between the edge of optical films 26 and electronic components 190. Portion 196-2 therefore serves as a physical barrier that prevents optical films 26 from striking electronic components 190. If a drop event causes optical films 26 to shift in the negative Y-direction, the optical films will be blocked by portion 196-2 of chassis 196 (and thus not reach or contact electronic components 190 along edge 50E of substrate 50).

Figure 15:
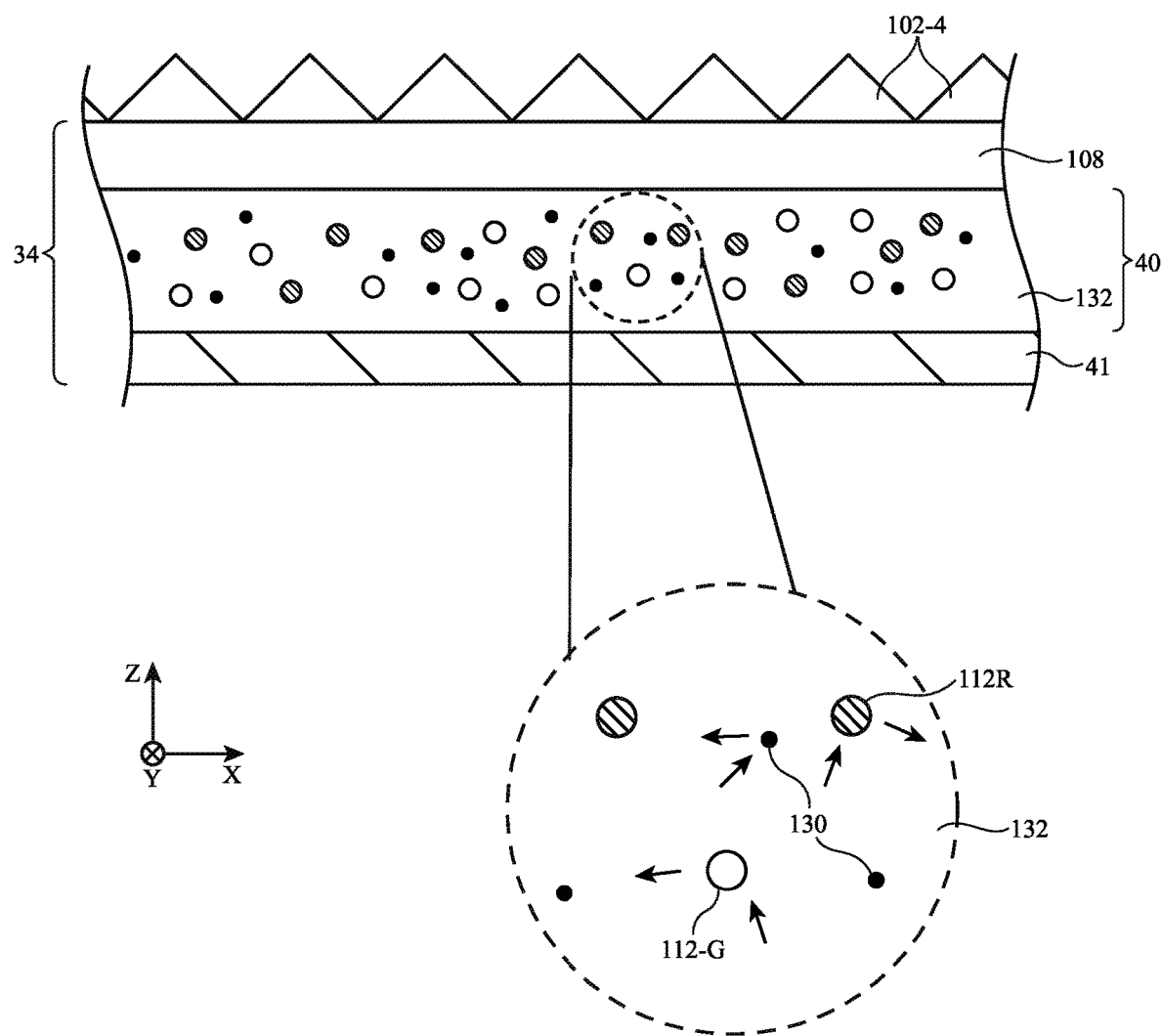
FIG. 15 is a cross-sectional side view of a color conversion layer with quantum dots and scattering dopants in accordance with an embodiment.

FIG. 15 is a cross-sectional side view of an illustrative color conversion layer 34 with scattering dopants for increasing the amount of off-axis blue light. As shown in the inset portion of FIG. 15, red quantum dots 112-R output light in a random direction (e.g., the direction that red light is output is not correlated to the direction that blue light is received). Similarly, green quantum dots 112-G output light in a random direction (e.g., the direction that green light is output is not correlated to the direction that blue light is received). To make the emission direction of blue light more random (and therefore equalize the off-axis emission of blue light to the off-axis emission of red and green light), scattering dopants 130 may be included in the phosphor layer. Scattering dopants 130 may elastically scatter blue light. This means that no energy is lost when the scattering dopants 130 receive blue light and that the wavelength of the light is not changed by the scattering dopants. However, the scattering dopants randomize the direction of the blue light. The blue light will be scattered by the scattering dopants while the red and green light will tend not to be scattered by the scattering dopants. Consequently, the distribution of red, blue, and green light may be equalized both on-axis and off-axis.

The average diameter of the scattering dopants may be between 5 and 20 nanometers, less than 500 nanometers, less than 100 nanometers, less than 50 nanometers, less than 20 nanometers, more than 5 nanometers, more than 1 nanometer, or any other desired diameter. The average diameter of quantum dots 112-R and 112-G may be more than 500 nanometers, more than 1 micron, more than 2 microns, between 1 and 3 microns, less than 5 microns, or any other desired diameter.

The quantum dots 112-R and 112-G as well as scattering dopants 130 may be distributed in a resin 132 (sometimes referred to as host resin 132). Resin 132 may have an index of refraction of less than 1.5, less between 1.45 and 1.55, less than 1.6, less than 1.55, greater than 1.4, between 1.4 and 1.6, or any other desired index of refraction. To achieve the desired scattering using the scattering dopants, the scattering dopants may be formed using a transparent material that has an index of refraction that is greater than 1.5, greater than 1.55, greater than 1.6, greater than 1.65, greater than 1.7, between 1.6 and 1.7, between 1.55 and 1.7, or any other desired index of refraction. The difference in refractive index between resin 132 and scattering dopants 130 may be greater than 0.05, greater than 0.1, greater than 0.15, greater than 0.2, between 0.1 and 0.2, between 0.15 and 0.2, or any other desired magnitude.

In general, the scattering dopants may be formed from any desired material (e.g., silicone, melamine, etc.). As one example, the scattering dopants may be formed from melamine ($C_3H_6N_6$, having an index of refraction of 1.66) whereas the resin 132 may have a refractive index of 1.49. The density of scattering dopants 130 within the phosphor layer may be less than 10 $g/m^3$, less than 5 $g/m^3$, less than 3 $g/m^3$, less than 2 $g/m^3$, more than 1 $g/m^3$, more than 2 $g/m^3$, more than 3 $g/m^3$, between 1 $g/m^3$ and 3 $g/m^3$, between 1.5 $g/m^3$ and 2.5 $g/m^3$, between 1 $g/m^3$ and 5 $g/m^3$, or any other desired density.

It should be noted that the example of including red and green quantum dots in the color conversion layer is merely illustrative. In general, any desired red/green color conversion materials may be included (e.g., red and green phosphor, quantum dots, perovskite, etc.).

Figure 16:
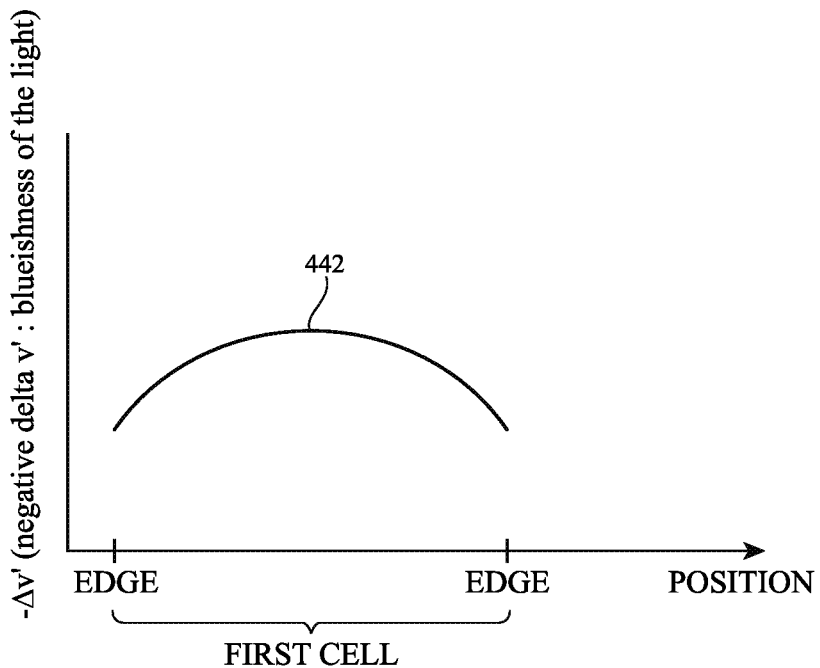
FIG. 16 is a graph illustrating the color variation from a light-emitting diode cell in $-\Delta v'$ (negative delta v'), quantifying the bluishness of the light, across the width of the light-emitting diode cell in accordance with an embodiment.

Returning to FIG. 3 which shows LED cells 38C, the light from the edge of a cell 38C tends to have been recycled more than light emitted from the center of the cell. Therefore, light from the edge of the cell may be less blue than light from the middle of the cell. FIG. 16 is a graph illustrating this effect. As shown by curve 442 in FIG. 16, light from the center of cell is bluer than light from the edges of the cell. The shape of the profile shown in FIG. 16 is merely illustrative. In general, the profile may have any desired shape.

Figure 17:
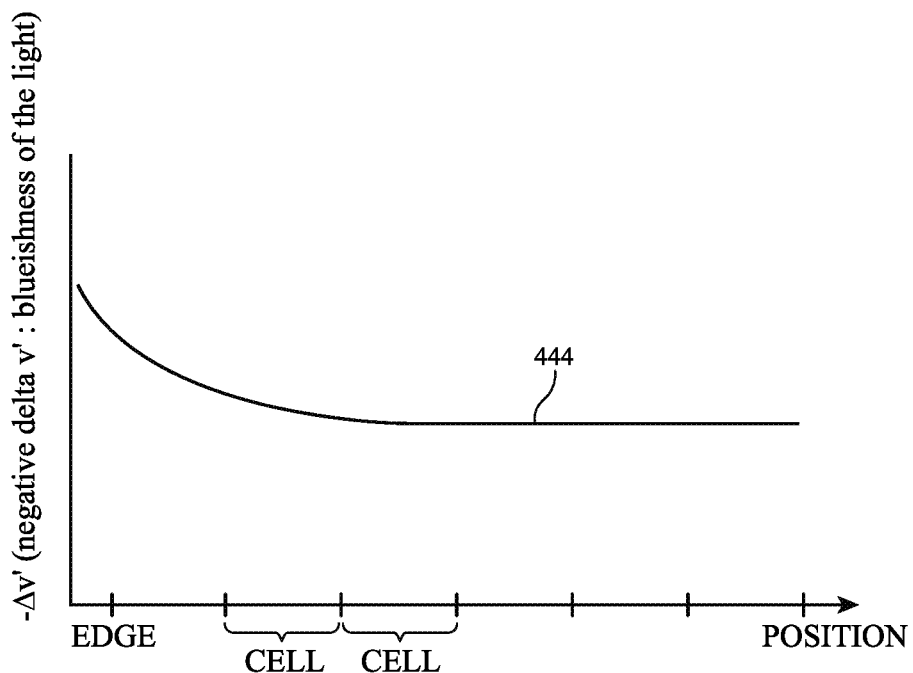
FIG. 17 is a graph illustrating how $-\Delta v'$ (negative delta v'), quantifying the bluishness of the light from a display, may vary across the width of the display in accordance with an embodiment.

Within the display (e.g., the middle of the display), light from a given cell is mixed with light from neighboring cells to produce display light of a uniform color (with a particular amount of blue light). However, at the edges of the display, there may be a shortage of yellow light (because at an edge, yellow light from a neighboring cell is absent at the border). This makes light from the edge of the display bluer than light from the middle of the display. This effect is shown in the graph of FIG. 17. As shown by curve 444, light from the edge of the display is bluer than light from the middle of the display. Each mark along the X-axis indicates the border of a respective cell 38C. As shown, light exiting from the two cells closest to the edge of the display is bluer than the remaining cells in the display. This example is merely illustrative, and light exiting from any desired number of cells may be bluer than the remaining cells in the display depending on the specific display design. The curve shown in FIG. 17 is merely illustrative and may have a different shape if desired.

To mitigate the color non-uniformity of the emitted light from the display, color conversion layer 34 may have non-uniformities across the active area of the display. In FIG. 15, phosphor layer 40 has a uniform thickness (e.g., the dimension in the Z-direction is uniform across the phosphor layer). To mitigate non-uniformities, the phosphor may instead have varying thickness.

Figure 18:
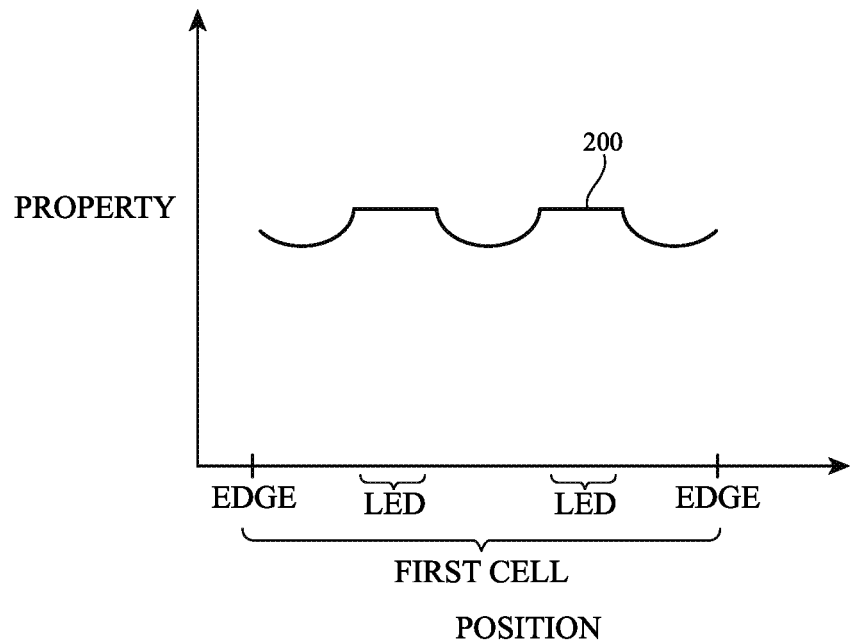
FIG. 18 is a graph of a color conversion layer property as a function of a position within a LED cell in accordance with an embodiment.

FIG. 18 is a graph showing how a color conversion layer property may vary across the width of a cell in LED array 36. The property may follow profile 200. In the example of FIG. 18, the cell has two light-emitting diodes along the width of the cell. For example, the cell may include four total light-emitting diodes arranged in a 2×2 grid. Profile 200 has a local maximum over each light-emitting diode. Between the light-emitting diodes (e.g., in portions not overlapping the light-emitting diodes), the profile dips and the property has a lower magnitude.

Consider the example where phosphor thickness is the varied property shown in FIG. 18. In the areas over the LEDs, the phosphor thickness is greater than in portions between the LEDs. The greater phosphor thickness results in more blue light being converted to red and green light, mitigating the high bluishness of the light over the LEDs (as shown in FIG. 16).

Phosphor thickness is merely one property of many that may be varied in the color conversion layer to increase the uniformity of light in the display. As other examples, the concentration of red quantum dots 112R may be the varied property in FIG. 18 (with a higher concentration of red quantum dots over the LEDs), the concentration of green quantum dots 112G may be the varied property in FIG. 18 (with a higher concentration of green quantum dots over the LEDs), the concentration of scattering particles 130 may be the varied property in FIG. 18 (with a higher concentration of scattering particles over the LEDs), the recycling percentage achieved by light-redirecting structures 102-4 may be the varied property in FIG. 18 (with the light-redirecting structures having a shape that results in higher recycling percentage over the LEDs than in portions not overlapping the LEDs), etc.

Figure 19:
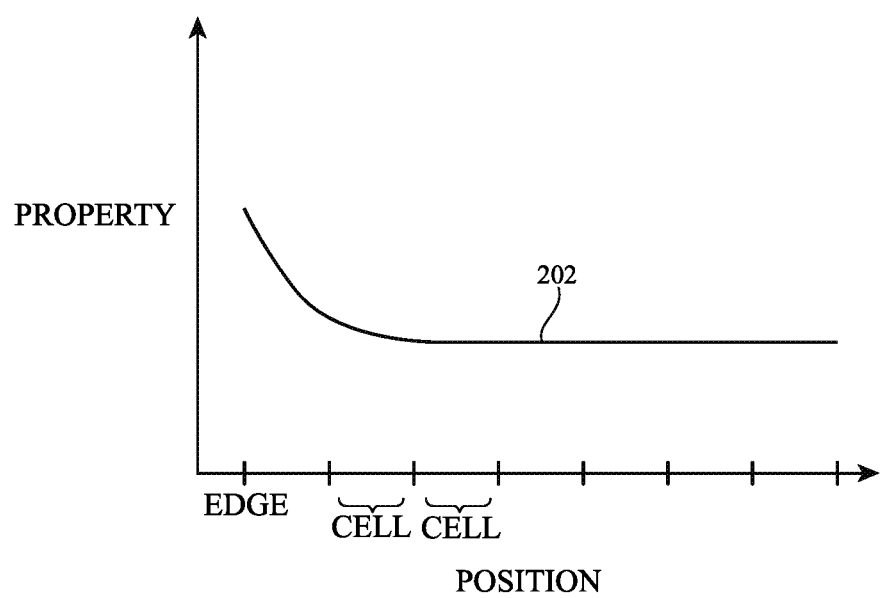
FIG. 19 is a graph of a color conversion layer property as a function of a position across a display in accordance with an embodiment.

FIG. 19 is a graph showing how a color conversion layer property may vary across the width of the display. The property may follow profile 202. In the example of FIG. 19, profile 202 increases towards the edge of the display.

Consider the example where phosphor thickness is the varied property as shown in FIG. 19. Towards the edge of the LED array, the phosphor thickness is greater than in portions in a central area of the LED array. The greater phosphor thickness results in more blue light being converted to red and green light, mitigating the high bluishness of the light in the edges of the display (as shown in FIG. 17).

Phosphor thickness is merely one property of many that may be varied in the color conversion layer to increase the uniformity of light in the display. As other examples, the concentration of red quantum dots 112R may be the varied property in FIG. 19 (with a higher concentration of red quantum dots at the edges of the color conversion layer), the concentration of green quantum dots 112G may be the varied property in FIG. 19 (with a higher concentration of green quantum dots at the edges of the color conversion layer), the concentration of scattering particles 130 may be the varied property in FIG. 19 (with a higher concentration of scattering particles at the edges of the color conversion layer), the recycling percentage achieved by light-redirecting structures 102-4 may be the varied property in FIG. 19 (with the light-redirecting structures having a shape that results in higher recycling percentage at the edges of the color conversion layer than at a central portion of the color conversion layer), etc.

In FIGS. 18 and 19, profiles 200 and 202 both have gradual changes. This example is merely illustrative. The profiles may instead have one or more step changes if desired. In general, profiles 200 and 202 may have any desired shapes.

The techniques of FIG. 18 (e.g., intra-cell color conversion layer non-uniformity) and the techniques of FIG. 19 (e.g., inter-cell color conversion layer non-uniformity) may both be used in a single color conversion layer if desired.

Figure 20A:
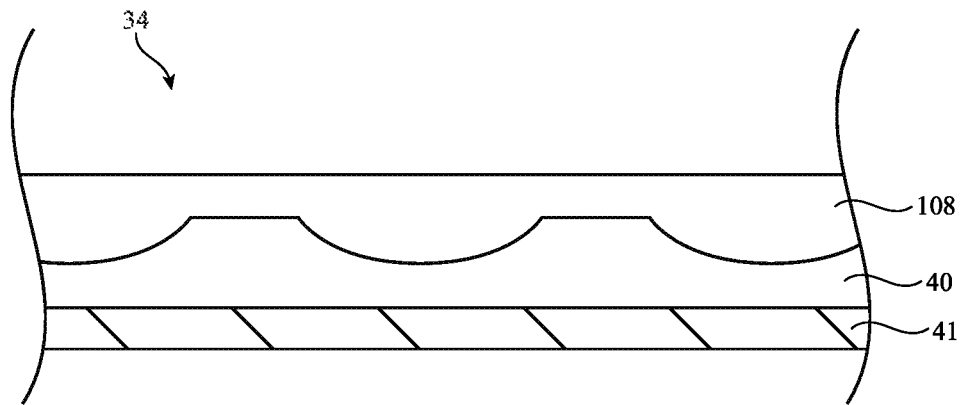
FIG. 20A is a cross-sectional side view of an illustrative color conversion layer with a phosphor layer having a varying thickness and covered by an additional film having a varying thickness in accordance with an embodiment.
Figure 20B:
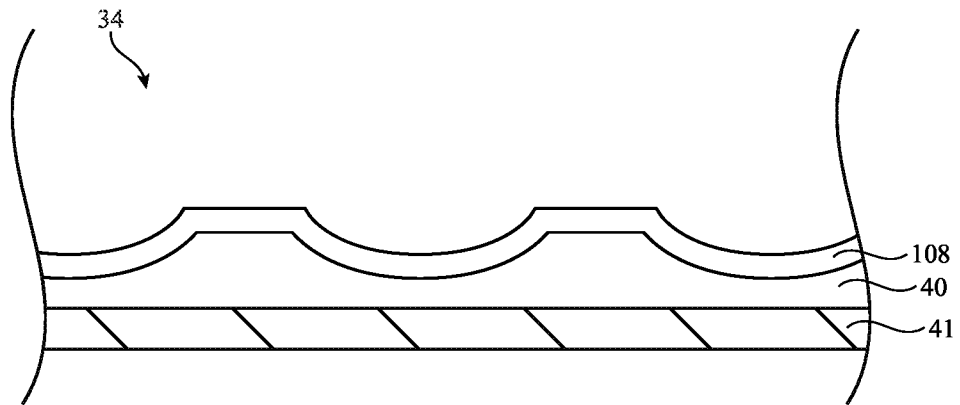
FIG. 20B is a cross-sectional side view of an illustrative color conversion layer with a phosphor layer having a varying thickness and covered by an additional film having a uniform thickness in accordance with an embodiment.

When the phosphor layer has a varying thickness, the additional film 108 formed over the phosphor layer may also have a varying thickness such that the additional film has a planar upper surface (as shown in FIG. 20A). Alternatively, the color conversion layer 34 may be embossed such that the phosphor layer 40 has a varying thickness and additional film 108 has a uniform thickness across the color conversion layer (as shown in FIG. 20B).

Figure 21:
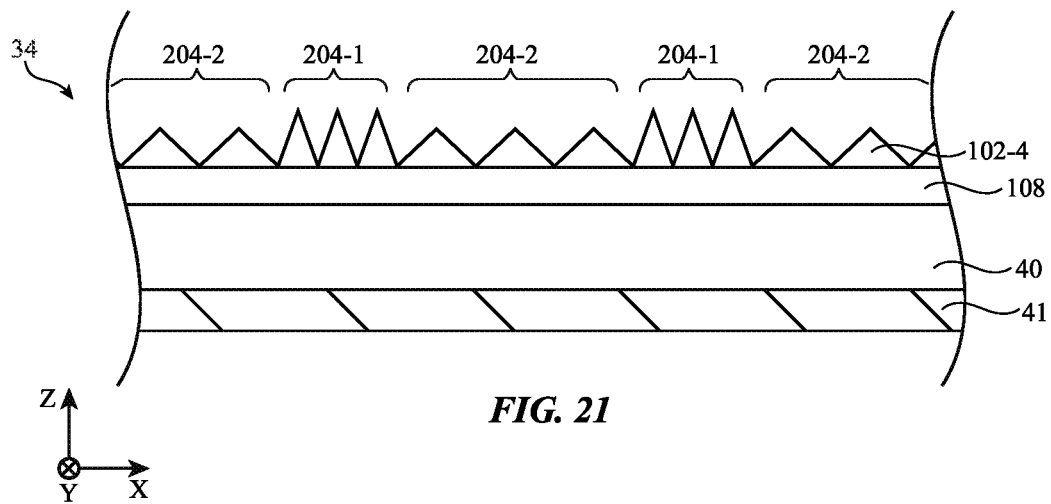
FIG. 21 is a cross-sectional side view of an illustrative color conversion layer having light-redirecting structures with different shapes in accordance with an embodiment.

FIG. 21 is a cross-sectional side view of an illustrative color conversion layer 34 that includes light-redirecting structures having a varying shape. In other words, for the color conversion layer 34 in FIG. 21, the recycling percentage of the light-redirecting structures is the property that varies as in FIG. 18 or FIG. 19. A first subset 204-1 of the light-redirecting structures may have a first shape with a first corresponding reflectance (e.g., reflectance of light received from underlying optical films, sometimes referred to as the recycling percentage). A first second 204-2 of the light-redirecting structures may have a second shape with a second corresponding reflectance (recycling percentage). The shapes of the light-redirecting structures may change according to a step function or may gradually change.

Figure 22:
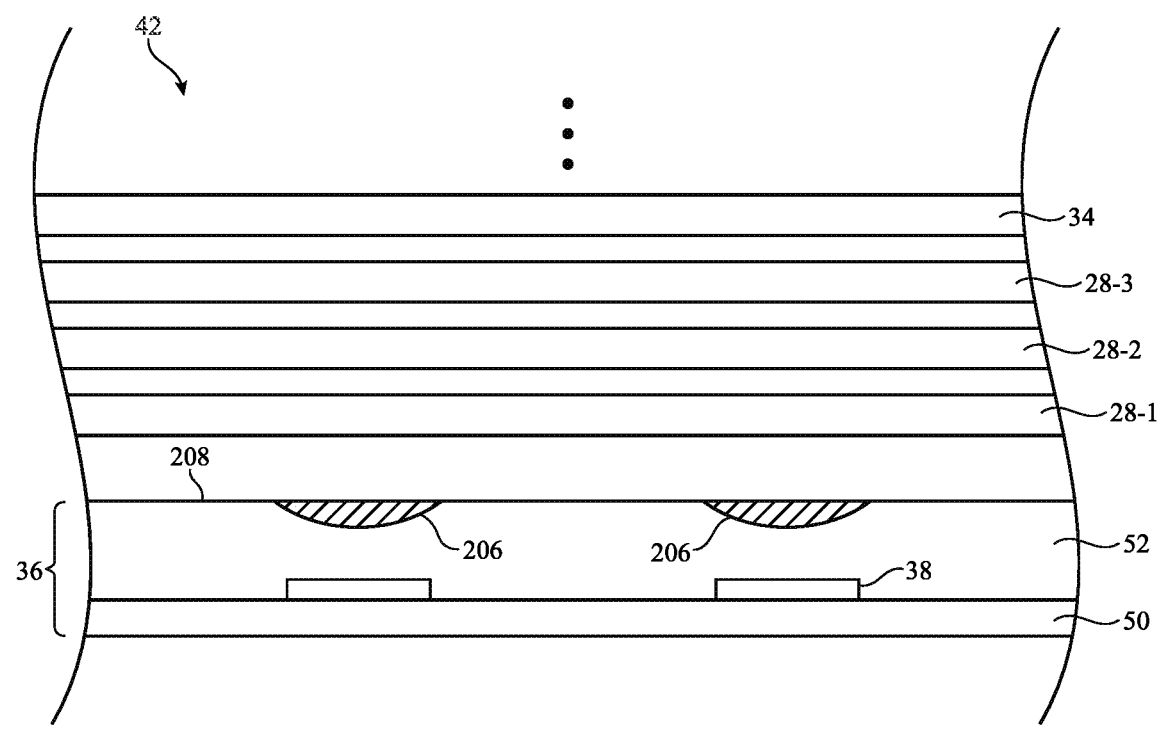
FIG. 22 is a cross-sectional side view of an illustrative backlight with color conversion patches formed on an upper surface of a slab of encapsulant in accordance with an embodiment.

The examples of FIGS. 18-21 to mitigate color non-uniformity in the backlight unit are merely illustrative. Instead or in addition to these techniques, a color conversion material may be formed on encapsulant layer 52 of LED array 36. FIG. 22 is a cross-sectional side view showing an arrangement of this type. In this example, color conversion layer 34 is uniform across the display. The color non-uniformity is mitigated using color conversion patches 206 that are formed on an upper surface of encapsulant 52 over LEDs 38. The color conversion patches may convert the color of light emitted by LEDs 38 (e.g., blue) to a different color (e.g., white). In other words, the wavelength of light having the peak brightness is different for light received by color conversion patches 206 than light exiting the color conversion patches. The color conversion patches may be formed from ink, quantum dots (as in phosphor layer 40), or any other desired material.

In FIG. 22, the color conversion patches 206 are formed in recesses in an upper surface 208 of encapsulant 52. In this arrangement, some or all of color conversion patches 206 may be formed beneath a plane defined by upper surface 208. In one example, shown in FIG. 22, the upper surface of patches 206 and upper surface 208 are coplanar (thus defining a smooth, continuous upper surface). As another possible arrangement, encapsulant 52 may have a planar upper surface without recesses. The color conversion patches 206 are then formed on the upper surface (e.g., above the plane defined by surface 208). Regardless of whether the color conversion patches are formed entirely below upper surface 208, partially below upper surface 208 and partially above upper surface 208, or entirely above upper surface 208, the color conversion patches 206 may have either a uniform thickness or a non-uniform thickness (as in FIG. 22).

As shown in FIG. 4, color conversion layer 34 includes light-redirecting structures 102-4 on an upper surface of film 108. Brightness-enhancement film 44-1 includes light-redirecting structures 110-1 on an upper surface of film 114-1. Brightness-enhancement film 44-2 includes light-redirecting structures 110-2 on an upper surface of film 114-2. Due to this arrangement, the lower surface of film 114-1 may be susceptible to being scratched by the tips of light-redirecting structures 102-4, the lower surface of film 114-2 may be susceptible to being scratched by the tips of light-redirecting structures 110-1, and the lower surface of film 30 may be susceptible to being scratched by the tips of light-redirecting structures 110-2. Scratching of this type may result in damage to the optical films that causes optical artifacts in the display.

Figure 23:
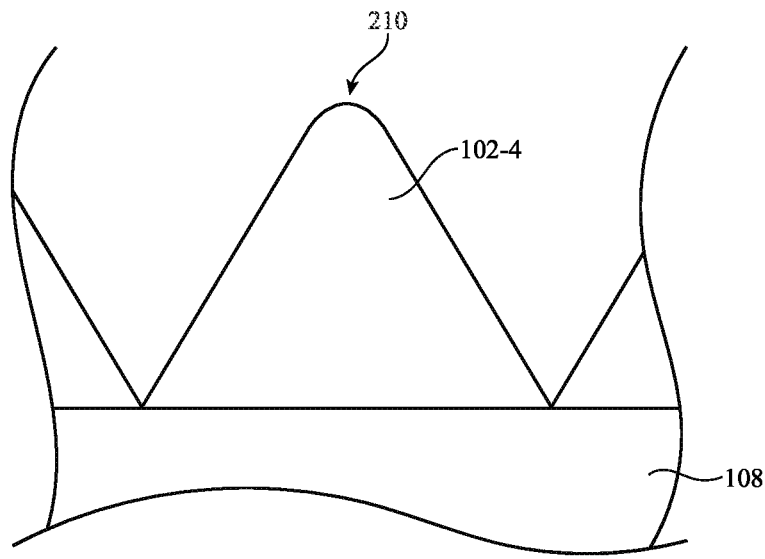
FIG. 23 is a cross-sectional side view of an illustrative light-redirecting structure with a rounded tip in accordance with an embodiment.

To mitigate scratching caused by protrusions within the backlight unit, the protrusions may have rounded tips. FIG. 23 is a cross-sectional side view of an illustrative light-redirecting structure 102-4. As shown in FIG. 23, each light-redirecting structure 102-4 has a rounded tip 210. Rounded tip 210 may be less likely to scratch the overlying film than when a non-rounded tip is used.

Rounded tip 210 may have a radius of curvature that is greater than 0.3 microns, greater than 0.4 microns, greater than 0.5 microns, greater than 0.7 microns, greater than 1.0 micron, less than 1.5 microns, less than 3 microns, less than 1.0 micron, between 0.4 microns and 1.5 microns, etc.

Figure 24:
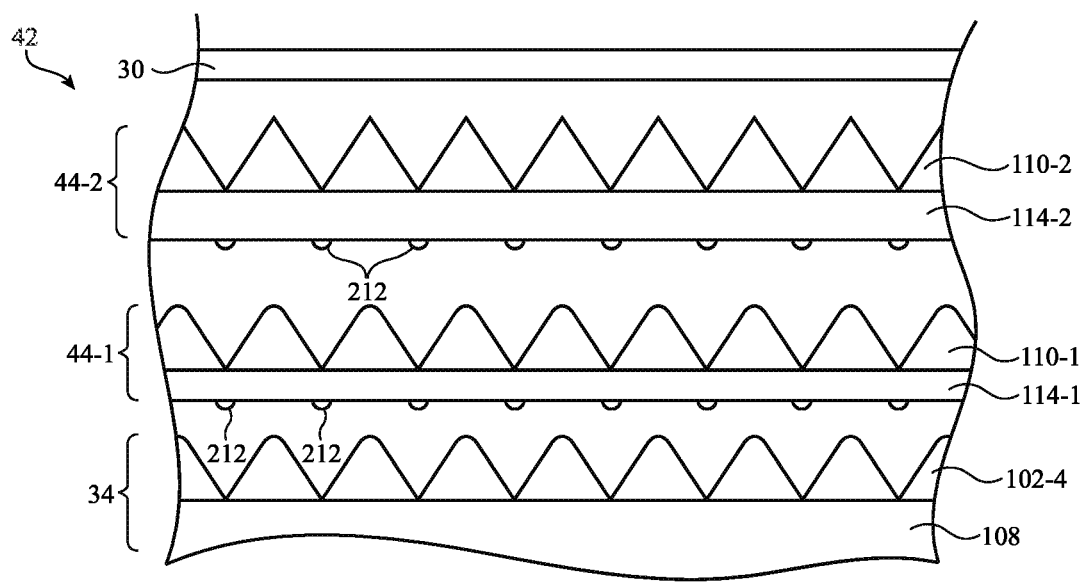
FIG. 24 is a cross-sectional side view of an illustrative backlight unit with multiple optical films having light-redirecting structures with rounded tips in accordance with an embodiment.

FIG. 24 is a cross-sectional side view of an illustrative backlight unit showing how light-redirecting structures 102-4 in color conversion layer 34 and light-redirecting structures 110-1 in brightness-enhancement film 44-1 may both have rounded tips similar to as shown in FIG. 23. The rounded tips of both structures 102-4 and 110-1 may have a radius of curvature that is greater than 0.3 microns, greater than 0.4 microns, greater than 0.5 microns, greater than 0.7 microns, greater than 1.0 micron, less than 1.5 microns, less than 3 microns, less than 1.0 micron, between 0.4 microns and 1.5 microns, etc. Structures 102-4 and 110-1 may have rounded tips regardless of whether structures 102-4 and 110-1 have a pyramidal shape (e.g., with a square base and four triangular faces that meet at a vertex), a triangular pyramidal shape (e.g., with a triangular base and three triangular faces that meet at a vertex), a partial-cube shape (e.g., corner-cubes by three square faces that meet at a vertex), a tapered pyramid structure, an elongated structure (as discussed earlier in connection with structures 110-1 and 110-2), etc.

In some cases, light-redirecting structures 110-2 may have rounded tips similar to as shown in FIG. 23 (and in structures 110-1 and 102-4 in FIG. 24). However, scratching the underlying surface of diffusion film 30 may not produce detrimental optical artifacts in the display. Therefore, structures 110-2 may have sharp tips (e.g., not rounded tips). Said another way, the radius of curvature of the tips of structures 110-2 may be less than the radius of curvature of the tips of structures 110-1 and 102-4 (e.g., by greater than 0.1 microns, greater than 0.2 microns, greater than 0.3 microns, greater than 0.4 microns, greater than 0.5 microns, greater than 0.7 microns, greater than 1.0 micron, less than 1.5 microns, less than 3 microns, less than 1.0 micron, between 0.4 microns and 1.5 microns, etc.). The radius of curvature of the tips of structures 110-2 may be less than 0.1 microns, less than 0.2 microns, less than 0.3 microns, less than 0.4 microns, etc.

In addition to preventing scratching, the rounded tips of structures 110-1 and 102-4 may reduce the coefficient of friction between the adjacent optical films in the backlight unit (e.g., between films 34 and 44-1 and between films 44-1 and 44-2). This reduction in friction may reduce the likelihood of the optical films wrinkling during operation of the device (e.g., due to shifting from an impact event or thermal expansion). The coefficient of friction between adjacent optical films may additionally be reduced by including clear dots 212 on the bottom surface of base film 114-1 and/or 114-2. The clear dots 212 may be optically invisible (e.g., the clear dots do not impact the optical performance of the backlight). However, the clear dots 212 further reduce the coefficient of friction between adjacent optical films in the backlight unit. The clear dots may have a uniform distribution across the optical films (e.g., distributed evenly across a given optical film), may be concentrated at an edge of the optical films (e.g., included in a ring shape around the periphery of a given optical film but not in a central portion of that optical film), etc. The clear dots 212 may be formed from clear ink or any other desired material.

Figure 25:
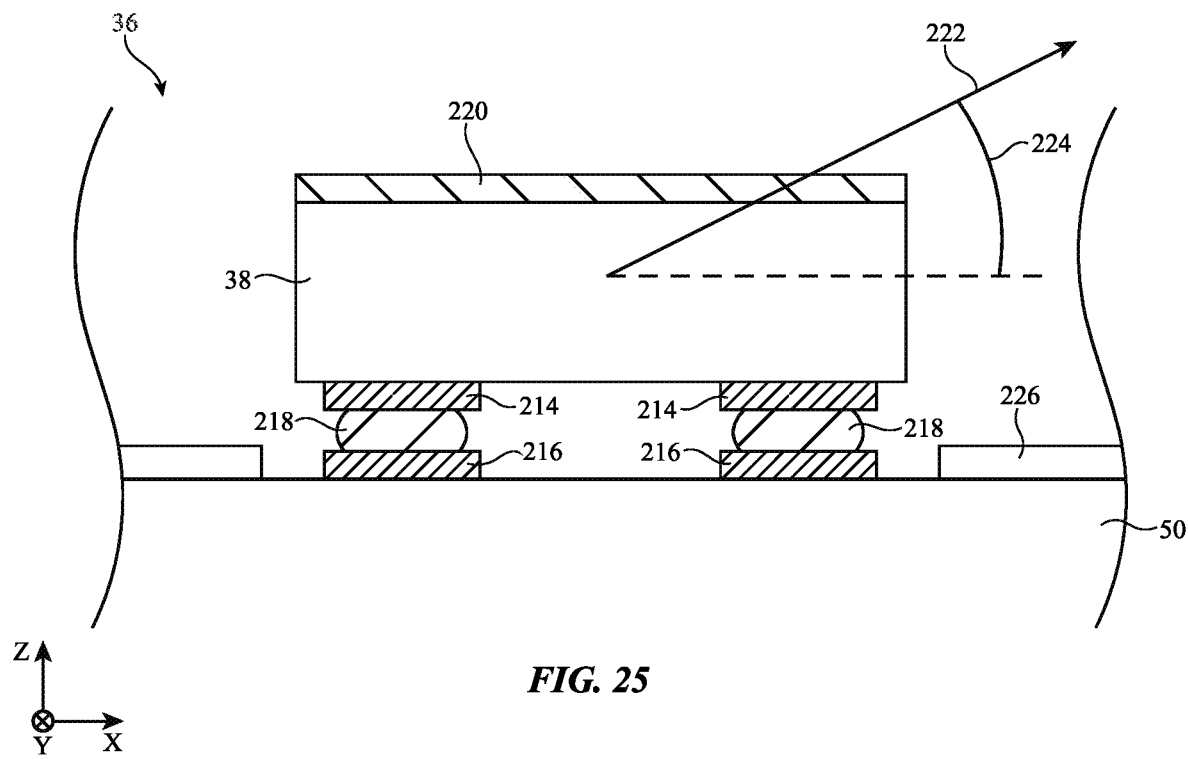
FIG. 25 is a cross-sectional side view of an illustrative light-emitting diode that emits light with a peak brightness at a non-zero angle in accordance with an embodiment.

FIG. 25 is a cross-sectional side view of an illustrative light-emitting diode in LED array 36. As shown, LED 38 may be mounted on substrate 50. LED 38 may have conductive contact pads 214 that are physically and electrically connected to respective conductive contact pads 216 on substrate 50 by solder 218. Each light-emitting diode may be formed in a respective package (e.g., that includes sapphire) that is attached to the substrate 50.

A distributed Bragg reflector (DBR) 220 may be included over an upper surface of each LED 38. In some cases, DBR 220 may reflect substantially all light generated by LED 38 such that the LED serves as a side-emitter (and emits light primarily in a direction that is parallel to the XY-plane and substrate 50). Alternatively, the reflectance of DBR 220 may be tuned to allow some but not all light to pass through DBR 220. For example, angled light 222 may pass through DBR 220 instead of being reflected.

The tuning of DBR 220 may result in LED 38 having a peak emission angle 224 (e.g., the angle relative to the substrate 50 and XY-plane with the highest intensity of emitted light from LED 38) that is greater than 0 degrees, greater than 10 degrees, greater than 20 degrees, greater than 30 degrees, greater than 45 degrees, greater than 60 degrees, greater than 70 degrees, less than 10 degrees, less than 20 degrees, less than 30 degrees, less than 45 degrees, less than 60 degrees, less than 70 degrees, less than 90 degrees, between 5 degrees and 85 degrees, between 5 degrees and 45 degrees, between 1 degree and 30 degrees, between 45 degrees and 85 degrees, between 60 degrees and 89 degrees, etc. Tuning DBR 220 in this manner may increase the efficiency of the display (relative to arrangements where LED 38 is a side-emitter).

A reflective layer 226 may be formed on an upper surface of substrate 50 to increase the efficiency of the display. Reflective layer 226 may have a reflectance that is greater than 60%, greater than 70%, greater than 80%, greater than 90%, greater than 95%, greater than 99%, etc. Reflective layer 226 may be formed from any desired material (e.g., a white solder resist layer). Each LED may be formed in a respective opening in reflective layer 226.

Figure 26:
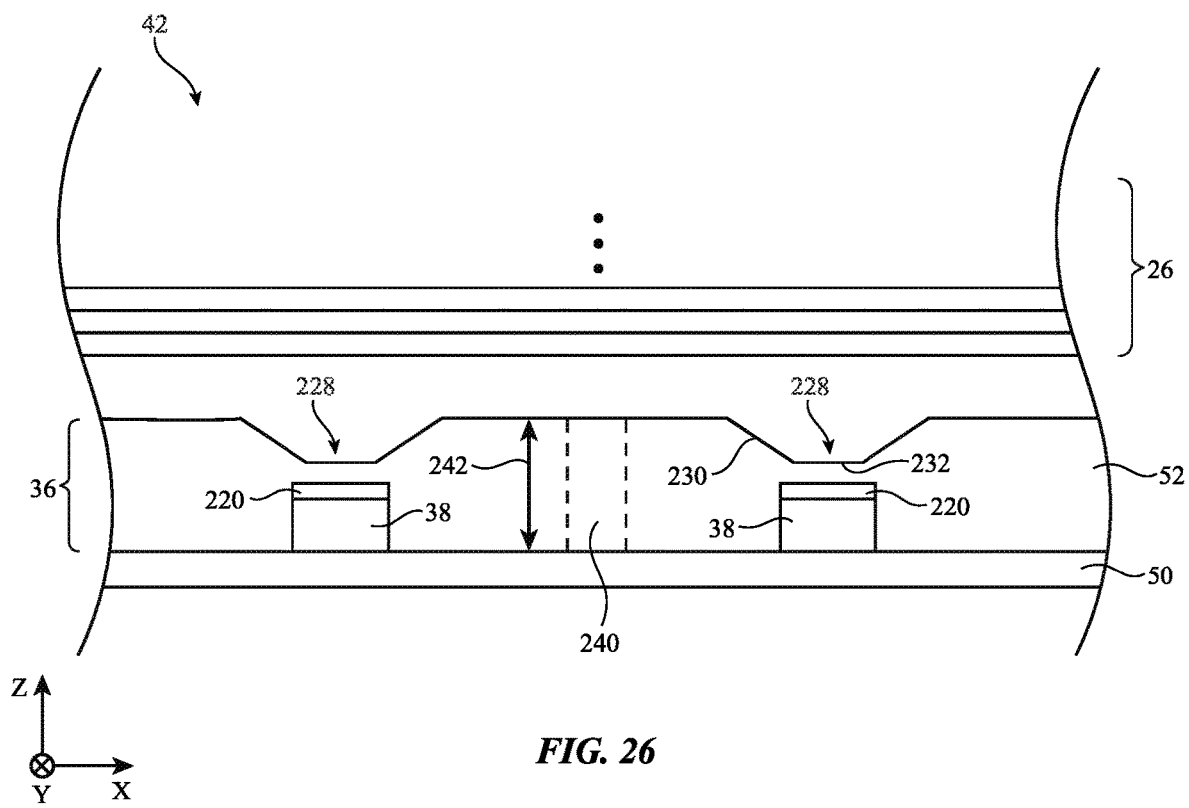
FIG. 26 is a cross-sectional side view of an illustrative backlight unit with light-emitting diodes covered by an encapsulant layer with recesses over the light-emitting diodes in accordance with an embodiment.

To mitigate hotspots in the display caused by LEDs 38, encapsulant 52 may have recesses formed over the LEDs. FIG. 26 is a cross-sectional side view of an illustrative backlight unit 42 of this type. As shown in FIG. 26, a recess 228 is formed over each LED 38 within LED array 36. Each recess increases the amount of light from LED 38 that is reflected via total internal reflection (at the encapsulant-air interface). This better disperses light from LED 38 within the XY-plane, mitigating hotspots caused by the LEDs.

Figure 27A:
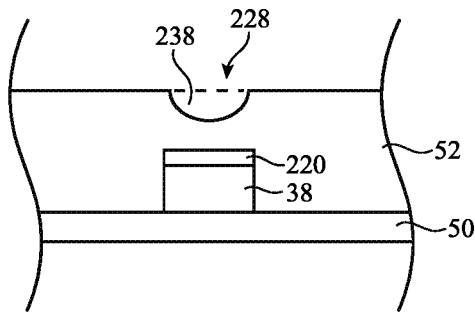
FIGS. 27A-27E are cross-sectional side views showing illustrative recesses in encapsulant having various shapes in accordance with various embodiments.
Figure 27B:
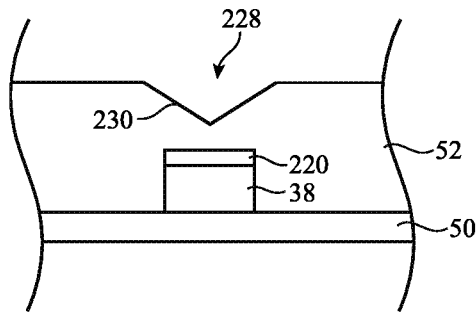

Recesses 228 may have any desired shape. In FIG. 26, the recesses 228 have a conical shape. In other words, an edge surface 230 extends in a circle (or oval) around the footprint of LED 38. This example is merely illustrative. FIG. 27A shows an alternate example where recess 228 has a semispherical shape (e.g., the recess has spherical curvature). In FIG. 26, the conical shape of recesses 228 terminates at a flat surface 232. This example is merely illustrative. FIG. 27B shows an alternate example where recess 228 has a conical shape with an edge surface 230 that meets at a vertex (instead of a flat surface as in FIG. 26).

Figure 27C:
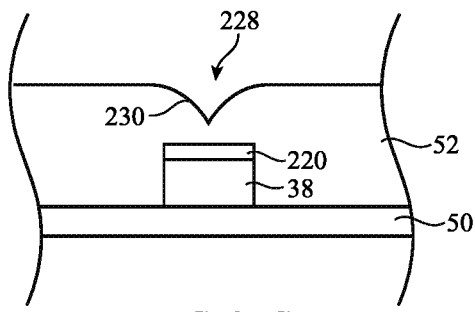
Figure 27D:
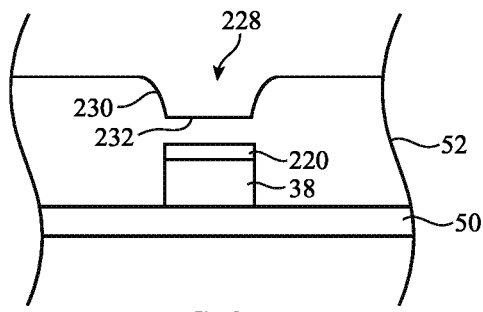
Figure 27E:
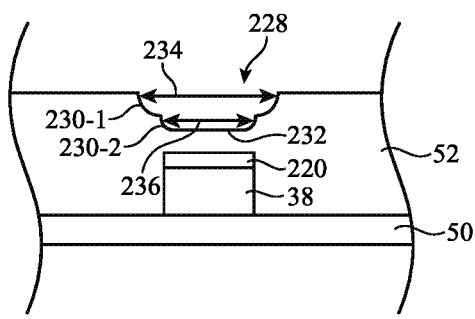

In FIG. 27C, edge surfaces 230 of the recess are curved and meet at a vertex. In FIG. 27D, edge surfaces 230 of the recess are curved and meet at a flat surface 232. Recess 228 may have multiple portions with different widths. In the example of FIG. 27E, a first portion of the recess has a first width 234 whereas a second portion of the recess has a second width 236. The second (lower) portion may have a smaller width than the first (upper) portion of the recess. In other words, width 236 is smaller than width 234.

In general, each encapsulant recess 228 may have any desired shape. Regardless of the shape of the recess, a portion of encapsulant 52 may remain present between an upper surface of LED 38 (and DBR 220) and the recess. The width of each recess may be greater than the width of the LED, may be greater than the 1.5 times the width of the LED, may be greater than the 2 times the width of the LED, may be less than the 3 times the width of the LED, etc.

Regardless of the shape of the recess, the recess may optionally be filled by a filler material 238 (as shown in FIG. 27A, for example). The filler material may be a gray ink or a color conversion material, as possible examples. When the filler material is omitted, the recesses may instead be filled with air.

Incorporating recesses of the type shown in FIGS. 26 and 27 may mitigate hotspots cased by LEDs 38 in LED array 36. This may allow one or more optical films to be omitted from the backlight unit, reducing the thickness, manufacturing cost, and manufacturing complexity of the display. For example, when recesses 228 are included in encapsulant 52, only five or six optical films may be needed to provide sufficiently uniform backlight to display panel 24 (instead of seven as in FIG. 4 when no encapsulant recesses are included).

As shown in FIG. 26, an opaque dam 240 may optionally be formed between adjacent LEDs in LED array 36. Alternatively, opaque dam 240 may be formed at the border between adjacent LED cells 38C (see FIG. 3). Dam 240 may have the same thickness 242 as encapsulant 52 or may have a smaller thickness than encapsulant 52 (such that the encapsulant is formed over and covers an upper surface of each dam 240).

An air gap may also be formed in place of dam 240. The air gap may extend completely through encapsulant 52 (such that the encapsulant has a thickness 242 of 0) or only partially through encapsulant 52 (such that the encapsulant has a non-zero thickness 242 overlapped by the air gap).

Figure 28:
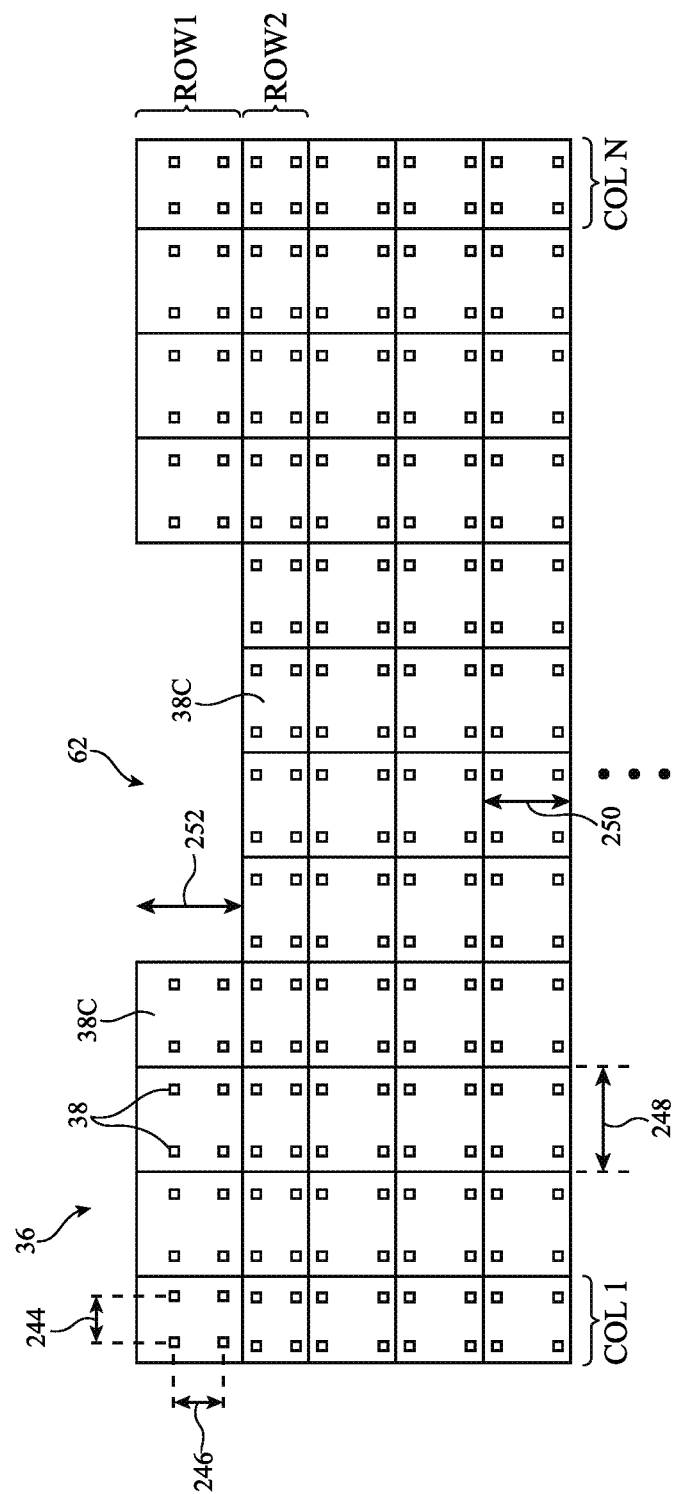
FIG. 28 is a top view of an illustrative LED array having LED cells with varying pitch in accordance with an embodiment.

FIG. 28 is a top view of LED array 36 showing how the pitch of the LEDs and/or the dams may be adjusted to mitigate non-uniformities in the display. As shown in FIG. 28, the LEDs 38 in LED array 36 are arranged in a plurality of cells 38C. In the example of FIG. 28, each cell includes a 2×2 grid of LEDs 38. The LEDs have a horizontal pitch 244 and a vertical pitch 246. Cells 38C are defined by dams (e.g., opaque dams) that have a horizontal pitch 248 and a vertical pitch 250.

The display may be susceptible to having a lower than desired luminance at the edges. To mitigate this non-uniformity, the pitch of the LEDs and/or dams may be reduced at the edges of the display. In the example of FIG. 28, there are m rows and n columns of LED cells 38C. The left-most column of LED cells (COL 1) and the right-most column of LED cells (COL N) may have a lower horizontal dam pitch 248 (and, correspondingly, a lower cell width) than the remaining, central columns of LED cells. Similarly, the row of LED cells that is below notch 62 (ROW 2) may have a lower vertical dam pitch 250 (and, correspondingly, a lower cell height) than the remaining, central rows of LED cells. The final row of LED cells in the LED array (not explicitly shown in FIG. 28) may also have a lower vertical dam pitch 250 than the remaining, central rows of LED cells. Reducing the dam pitch adjacent to the edges of the display in this manner may mitigate non-uniformities at the edges of the display.

In FIG. 28, the vertical dam pitch 250 in the first row of LED cells (that is interrupted by the notch) is larger than the row 2 vertical dam pitch and the vertical dam pitch of the central rows. The vertical dam pitch in the first row is set to match the height 252 of notch 62. This example is merely illustrative. In an alternate arrangement, multiple rows of LED cells 38C may be interrupted by notch 62 (instead of just 1 as in FIG. 28) and those rows of LED cells 38C may have a vertical dam pitch 250 that is lower than the notch height 262.

In the example of FIG. 28, LEDs 38 have a uniform pitch across the LED array (whether or not the LEDs are in the smaller edge cells). Alternatively, the LEDs 38 at the edge of the array (e.g., in the smaller edge cells) may also have a smaller LED pitch (in the horizontal and/or vertical direction) than in the central portion of the array.

Figure 29:
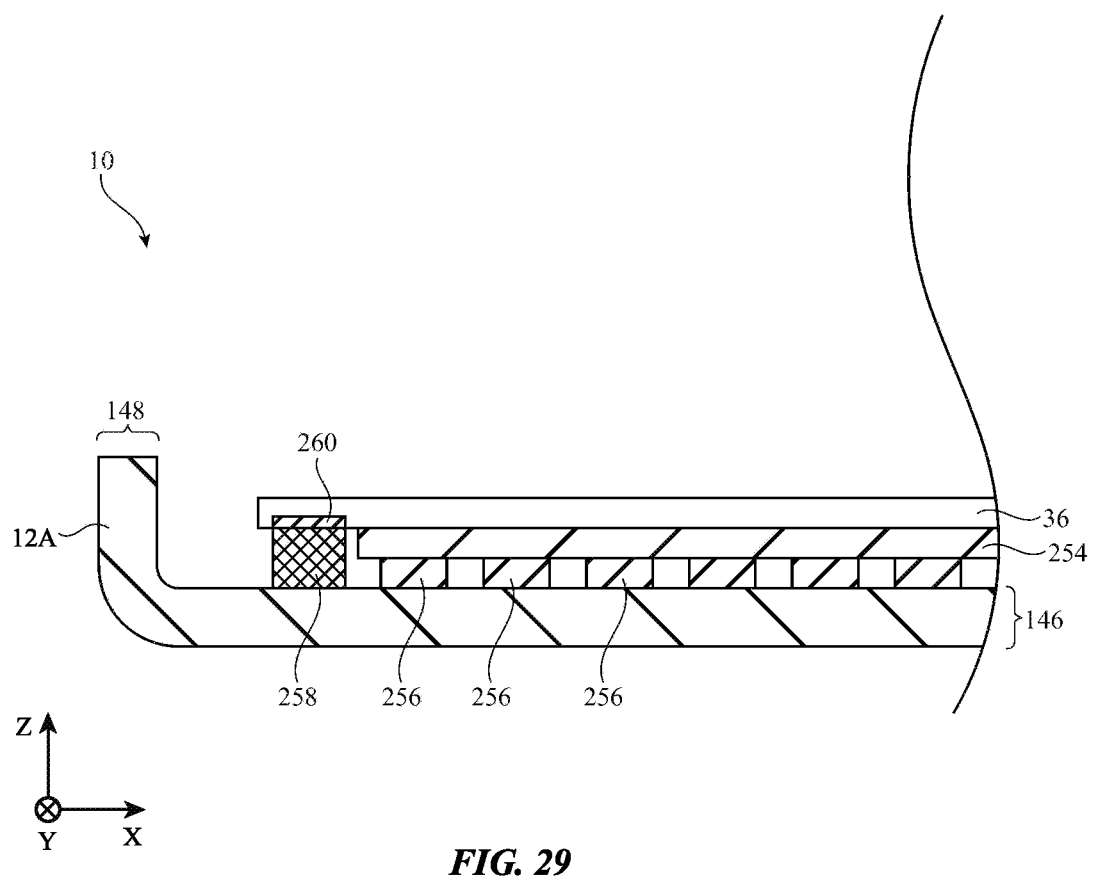
FIG. 29 is a cross-sectional side view of an illustrative electronic device showing how multiple adhesive layers may attach the LED array to a housing wall in accordance with an embodiment.
Figure 30:
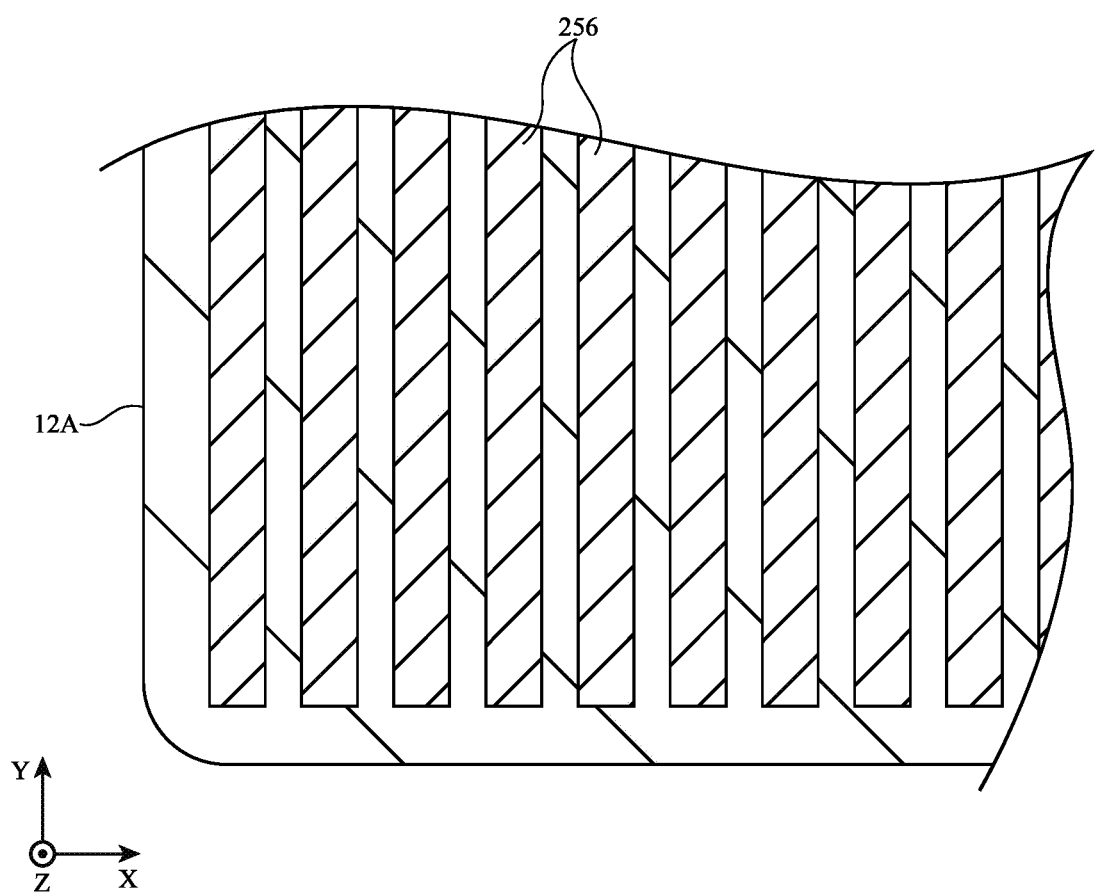
FIG. 30 is a top view of an illustrative electronic device showing strips of adhesive in accordance with an embodiment.
Figure 31:
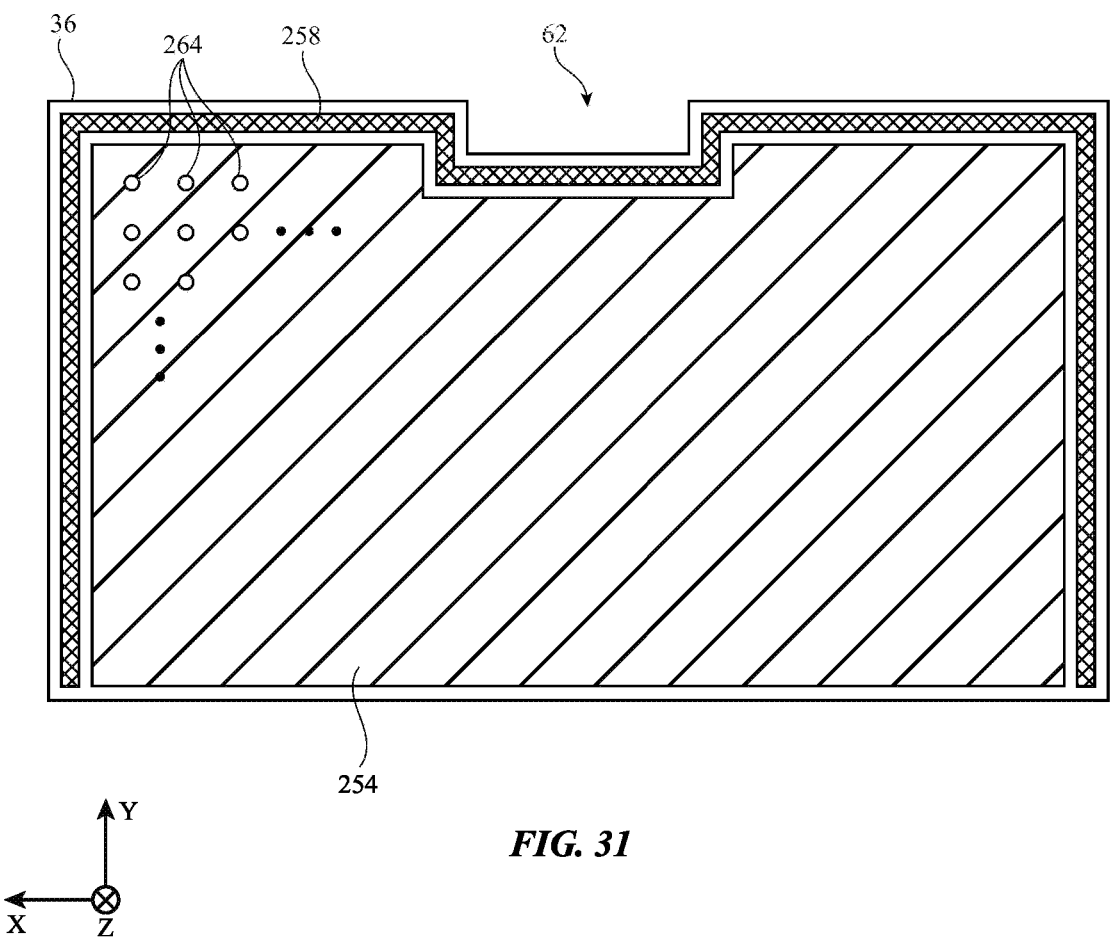
FIG. 31 is a rear view of an illustrative LED array showing how conductive adhesive may be formed around the periphery of the array and an adhesive layer with an array of holes is attached to a central portion of the LED array in accordance with an embodiment.

FIGS. 29-31 show adhesive layers that may be used to attach LED array 36 to display housing 12A. FIG. 29 is a cross-sectional side view of device 10. As shown, a first adhesive layer 254 is attached to a lower surface of LED array 36 (e.g., a lower surface of substrate 50 in LED array 36). Adhesive layer 254 (sometimes referred to as spacer layer 254) may be a single-sided adhesive where the surface coupled to LED array 36 is adhesive and the opposing surface is not adhesive. A plurality of adhesive strips 256 attach spacer layer 254 to rear wall 146 of housing 12A. Adhesive strips 256 may be formed from discrete, elongated, and double-sided adhesive strips. A first side of each adhesive strip is attached to spacer 254 and a second side of each adhesive strip is attached to an interior surface of the rear wall of housing 12A.

Additionally, a conductive adhesive 258 may be attached between an interior surface of the rear wall of housing 12A and LED array 36 (e.g., a lower surface of substrate 50 in LED array 36). Specifically, the conductive adhesive 258 may be physically and electrically connected to a ground trace 260 in LED array 36. Ground trace 260 may extend partially or completely around the periphery of LED array 36. Conductive adhesive 258 therefore electrically connects ground trace 260 to housing 12A (which may be conductive and serve as a ground structure). The conductive adhesive 258 has a thickness that is equal to the sum of the thickness of adhesive layer 254 and the thickness of adhesive strips 256. In addition to serving as a grounding structure, conductive adhesive 258 may mitigate undesired electrostatic discharge in device 10.

Adhesive layer 256 may be formed in strips (instead of a continuous plane like layer 254) to increase the reworkability of the display. In other words, stretching and heating may be used to deliberately remove adhesive strips 256 if desired.

Adhesive layer 254 may be formed from a layer having a low dielectric constant to mitigate parasitic capacitances and corresponding system power loss. The dielectric constant of adhesive layer 254 may be less than 10, less than 6.0, less than 5.0, less than 4.0, less than 3.0, less than 2.0, etc.

The thickness of the strips 256 (e.g., the dimension parallel to the Z-direction) may be less than 100 microns, less than 80 microns, less than 60 microns, greater than 30 microns, between 30 microns and 70 microns, etc. The thickness of the spacer 254 (e.g., the dimension parallel to the Z-direction) may be less than 150 microns, less than 100 microns, less than 80 microns, less than 60 microns, greater than 50 microns, greater than 70 microns, between 50 microns and 100 microns, etc. The thickness of the conductive adhesive 258 (e.g., the dimension parallel to the Z-direction) may be less than 250 microns, less than 150 microns, less than 100 microns, greater than 100 microns, greater than 120 microns, between 100 microns and 150 microns, etc.

FIG. 30 shows how adhesive strips 256 may be elongated in the Y-direction. Each strip extends along a longitudinal axis that is parallel to the Y-direction. In other words, the length of each strip may be longer than the width of each strip and the length of each strip may extend parallel to the Y-axis. This example is merely illustrative. The adhesive strips may instead extend parallel to the X-axis if desired. Each strip may have a length that is more than 3× greater than the width, more than 5× greater than the width, more than 10× greater than the width, more than 20× greater than the width, more than 50× greater than the width, etc.

FIG. 31 is a rear view of LED array 36 showing the relative positions of conductive adhesive 258 and adhesive layer 254. As shown, conductive adhesive 258 extends around the periphery of the LED array. In the example of FIG. 31, conductive adhesive 258 extends along the left, upper, and right edges of the LED array (but not the lower edge of the LED array). The conductive adhesive 258 therefore surrounds the LED array on three out of four sides. The footprint of ground trace 260 (shown explicitly in FIG. 29) may be the same or approximately the same as the footprint of conductive adhesive 258. In other words, the ground trace 260 also surrounds the LED array on three out of four sides (along the left, upper, and right edges). The conductive adhesive 258 (and grounding trace 260 may be routed around the notch 62 in LED array 36, as shown in FIG. 31.

Adhesive layer 254 covers a central area of the LED array 36. The adhesive layer 254 may have a notch to accommodate notch 62 in the LED array 36. Adhesive layer 254 may have an array of openings 264. Each opening 264 may be a through-hole that extends entirely through the adhesive layer (e.g., from a first surface of the adhesive layer to a second, opposing surface of the adhesive layer). The openings 264 allow for the passage of air during the lamination process, mitigating bubble formation. Each opening 264 may have a diameter (or width) that is greater than 0.1 millimeters, greater than 0.5 millimeters, greater than 1.0 millimeter, greater than 1.5 millimeters, greater than 3.0 millimeters, less than 0.1 millimeters, less than 0.5 millimeters, less than 1.0 millimeter, less than 1.5 millimeters, less than 3.0 millimeters, between 1.0 millimeters and 2.0 millimeters, etc. The total number of openings 264 in adhesive layer 254 may be greater than 200, greater than 300, greater than 400, greater than 500, greater than 750, greater than 1000, less than 200, less than 300, less than 400, less than 500, less than 750, less than 1000, between 250 and 750, etc.

It should be noted that any of the adhesive layers mentioned herein (e.g., layers 82, 84, 90, 92, 152, 154, 176, 178, 254, 256, and 258) may be formed from pressure sensitive adhesive (PSA), optically clear adhesive (OCA), liquid optically clear adhesive (LOCA), a cured adhesive, or any other desired type of adhesive.

The foregoing is merely illustrative and various modifications can be made to the described embodiments. The foregoing embodiments may be implemented individually or in any combination.

What is claimed is:

1. An electronic device comprising:
   a liquid crystal display panel; and
   a backlight unit that provides backlight for the liquid crystal display panel, wherein the backlight unit comprises:
   an array of light-emitting diodes, wherein each light-emitting diode emits blue light; and
   a color conversion layer, wherein the color conversion layer converts the blue light to white light, wherein the color conversion layer has a central area and an edge, wherein the central area overlaps multiple light-emitting diodes of the array of light-emitting diodes, wherein the color conversion layer has a thickness that varies as a function of position across the color conversion layer, wherein the thickness is uniform in the central area of the color conversion layer, and wherein the thickness increases from the central area towards the edge.

2. The electronic device defined in claim 1, wherein the color conversion layer has a phosphor layer that includes red quantum dots and green quantum dots distributed in a resin.

3. The electronic device defined in claim 2, wherein the color conversion layer includes an additional film over the phosphor layer and wherein the additional film also has a varying thickness.

4. The electronic device defined in claim 2, wherein the color conversion layer includes an additional film over the phosphor layer and wherein the additional film has a uniform thickness.

5. The electronic device defined in claim 2, wherein the color conversion layer further includes light-redirecting structures formed over the phosphor layer that recycle a percentage of light from the array of light-emitting diodes.

6. An electronic device comprising:
   a liquid crystal display panel; and
   a backlight unit that provides backlight for the liquid crystal display panel, wherein the backlight unit comprises:
   an array of light-emitting diodes;
   at least one light spreading layer formed over the array of light-emitting diodes;
   a color conversion layer formed over the at least one light spreading layer;
   a first brightness-enhancement film that is formed over the color conversion layer, wherein the color conversion layer includes a first plurality of protrusions that extend towards the first brightness-enhancement film and wherein each protrusion in the first plurality of protrusions has a rounded tip with a radius of curvature between 0.4 microns and 1.5 microns;
   a second brightness-enhancement film that is formed over the first brightness-enhancement film; and a diffusion film that is formed over the second brightness-enhancement film, wherein the second brightness-enhancement film includes a second plurality of protrusions that extend towards the diffusion film and wherein each protrusion in the second plurality of protrusions has a tip with a radius of curvature that is less than 0.3 microns.

7. The electronic device defined in claim 6, wherein the first brightness-enhancement film includes a third plurality of protrusions that extend towards the second brightness-enhancement film and wherein each protrusion in the third plurality of protrusions has a rounded tip with a radius of curvature between 0.4 microns and 1.5 microns.

8. The electronic device defined in claim 6, wherein each protrusion in the first plurality of protrusions is a pyramidal protrusion.

9. The electronic device defined in claim 6, wherein the first brightness-enhancement film has a base film and a third plurality of protrusions that extend from an upper surface of the base film away from the color conversion layer and wherein the first brightness-enhancement film includes a plurality of clear dots on a lower surface of the base film.

10. The electronic device defined in claim 9, wherein the clear dots are concentrated at an edge of the lower surface of the base film.

11. An electronic device comprising:
a liquid crystal display panel; and
a backlight unit that provides backlight for the liquid crystal display panel, wherein the backlight unit comprises:
an array of light-emitting diodes;
a slab of encapsulant formed over the array of light-emitting diodes, wherein the slab of encapsulant conforms to and directly contacts the array of light-emitting diodes;
a plurality of color conversion patches formed directly on an upper surface of the slab of encapsulant, wherein each color conversion patch overlaps a respective light-emitting diode in the array of light-emitting diodes;
at least one light spreading layer formed over the array of light-emitting diodes; and
a color conversion layer formed over the at least one light spreading layer.

12. The electronic device defined in claim 11, wherein each color conversion patch has a non-uniform thickness.

13. The electronic device defined in claim 11, wherein the plurality of color conversion patches is formed in corresponding recesses in the slab of encapsulant and wherein upper surfaces of the plurality of color conversion patches are coplanar with an upper surface of the slab of encapsulant.

* * * * *